US011568109B2

(12) United States Patent
Rejeb Sfar et al.

(10) Patent No.: US 11,568,109 B2
(45) Date of Patent: Jan. 31, 2023

(54) EXPERIENCE LEARNING IN VIRTUAL WORLD

(71) Applicant: DASSAULT SYSTEMES, Velizy-Villacoublay (FR)

(72) Inventors: Asma Rejeb Sfar, Velizy-Villacoublay (FR); Mariem Mezghanni, Velizy-Villacoublay (FR); Malika Boulkenafed, Velizy-Villacoublay (FR)

(73) Assignee: DASSAULT SYSTEMES, Velizy-Villacoublay (FR)

( * ) Notice: Subject to any disclaimer, the term of this patent is extended or adjusted under 35 U.S.C. 154(b) by 297 days.

(21) Appl. No.: 16/868,265

(22) Filed: May 6, 2020

(65) Prior Publication Data

US 2020/0356712 A1 Nov. 12, 2020

(30) Foreign Application Priority Data

May 6, 2019 (EP) .................................... 19305579

(51) Int. Cl.
*G06F 30/27* (2020.01)
*G06F 30/17* (2020.01)
(Continued)

(52) U.S. Cl.
CPC .............. *G06F 30/27* (2020.01); *G06F 30/17* (2020.01); *G06N 3/08* (2013.01); *G06N 5/04* (2013.01);
(Continued)

(58) Field of Classification Search
CPC ...... G06F 30/27; G06F 30/17; G06F 2111/18; G06F 30/12; G06F 2111/00; G06N 3/08;
(Continued)

(56) References Cited

U.S. PATENT DOCUMENTS

2006/0122820 A1 6/2006 Wieland et al.
2018/0012411 A1 1/2018 Richey et al.
(Continued)

OTHER PUBLICATIONS

Yuhua Chen, et al.; "ROAD: Reality Oriented Adaptation for Semantic Segmentation of Urban Scenes"; arXiV:1711.11556v2 [cs.CV]; Apr. 7, 2018; (10 pgs.)
(Continued)

*Primary Examiner* — Quoc A Tran
(74) *Attorney, Agent, or Firm* — Oblon, McClelland, Maier & Neustadt, L.L.P.

(57) ABSTRACT

A computer-implemented method of machine-learning is described that includes obtaining a dataset of virtual scenes. The dataset of virtual scenes belongs to a first domain. The method further includes obtaining a test dataset of real scenes. The test dataset belongs to a second domain. The method further includes determining a third domain. The third domain is closer to the second domain than the first domain in terms of data distributions. The method further includes learning a domain-adaptive neural network based on the third domain. The domain-adaptive neural network is a neural network configured for inference of spatially reconfigurable objects in a real scene. Such a method constitutes an improved method of machine learning with a dataset of scenes including spatially reconfigurable objects.

20 Claims, 19 Drawing Sheets

(51) Int. Cl.
  *G06N 3/08* (2006.01)
  *G06N 5/04* (2006.01)
  *G06F 111/18* (2020.01)
  *G06N 3/04* (2006.01)
  *G06N 3/00* (2006.01)
  *G06F 111/00* (2020.01)
  *G06F 30/12* (2020.01)

(52) U.S. Cl.
  CPC .......... *G06F 30/12* (2020.01); *G06F 2111/00* (2020.01); *G06F 2111/18* (2020.01); *G06N 3/008* (2013.01); *G06N 3/0454* (2013.01); *G06N 3/0472* (2013.01)

(58) Field of Classification Search
  CPC ........ G06N 5/04; G06N 3/008; G06N 3/0472; G06N 3/0454
  See application file for complete search history.

(56) References Cited

U.S. PATENT DOCUMENTS

| | | | |
|---|---|---|---|
| 2018/0182071 A1* | 6/2018 | Ayari | G06N 3/08 |
| 2018/0210980 A1 | 7/2018 | Shetty et al. | |
| 2018/0216442 A1 | 8/2018 | Shetty et al. | |
| 2018/0330194 A1 | 11/2018 | Peng et al. | |
| 2018/0345496 A1 | 12/2018 | Li et al. | |
| 2018/0357514 A1 | 12/2018 | Zisimopoulos et al. | |
| 2019/0066493 A1 | 2/2019 | Sohn et al. | |
| 2019/0317455 A1 | 10/2019 | Leon et al. | |
| 2020/0051303 A1 | 2/2020 | Li et al. | |
| 2020/0074266 A1* | 3/2020 | Peake | G06V 10/774 |
| 2020/0082041 A1 | 3/2020 | Albert | |
| 2020/0184278 A1* | 6/2020 | Zadeh | G06K 9/6264 |
| 2020/0410346 A1* | 12/2020 | Rappoport | G06N 3/04 |

OTHER PUBLICATIONS

Yuhua Chen, et al.; "Domain Adaptive Faster R-CNN for Object Detection in the Wild"; arXiv:1803.03243v1 [cs.CV]; Mar. 8, 2018; (10 pgs.).
J. Deng, et al.; "Imagenet Large Scale Visual Recognition Challenge 2017" (ILSVRC2017): 2017: URL http://www.imagenet.org/challenges/LSVRC/2017/; (3 pgs.).
J. Deng, et al.; "ImageNet: A Large-Scale Hierarchical Image Database", CVPR; 2012; (8 pgs.).
Debidatta Dwibedi, et al.; "Cut, Paste and Learn; Surprisingly Easy Synthesis for Instance Detection"; arXiv:1708.01642v1 [cs.CV]: Aug. 4, 2017: (11 pgs.).
Adrien Gaidon, et al.: "Virtual Worlds as Proxy for Multi-Object Tracking Analysis"; arXiv:1605.06457v1[cs.CV]; May 20, 2016; (10 pgs.).
Andreas Geiger, et al.; "Are we ready for Autonomous Driving? The KITTI Vision Benchmark Suite"; CVPR, 2012; (6 pgs.).
Kaiming HE, et al.; "Mask R-CNN":arXiv:1703.06470v3 [cs.CV]: Jan. 24, 2018; (12 pgs.).
Martin Heusel, et al.; "GANs Trained by a Two Time-Scale Update Rule Converge to a Local Nash Equilibrium": In Advances in Neural Information Processing Systems (NIPS): 2017: (38 pgs.).
Stefen Hinterstoisser, et al.; "On Pre-Trained Image Feature and Synthetic Images for Deep Learning"; arXiv:1710.10710v2 [cs.CV]: Nov. 16, 2017; (9 pgs.).
Matthew Johnson-Roberson, et al.; "Driving in the Matrix. Can Virtual Worlds Replace Human-Generated Annotations for Real World Tasks?", arXiv:1610.01983v2 [cs.CV]; Feb. 25, 2017, (8 pgs.).
Tsung-Yi Lin, et al.; "Microsoft COCO: Common Objects in Context"; arXiv:1405.0312v3 [cs.CV]; Feb. 21, 2015; (15 pgs.).
Alexander Mordvintsev, et al.; Open CV-Python Tutorials Documentation; https://media.readthedocs.org/pdf/opencv-python-tutroals/latest/opencv-python-tutroals.pdf; Nov. 5, 2017; (273 pgs.).
Patrick Perez, et al.; "Poisson Image Editing"; ACM Transactions on Graphics (TOG); vol. 22, No. 3; ACM; 2003; (6 pgs.).
Aayush Prakash, et al.; "Structured Domain Randomization: Bridging the Reality Gap by Context-Aware Synthetic Data"; arXiv:1810.10093v1 [cs.CV]; Oct. 23, 2018; (7 pgs.).
Shaoqing Ren, et al.; "Faster R-CNN: Towards Real-Time Object Detection with Region Proposal Networks"; arXiv:1506.01497v3 [cs.CV]; Jan. 6, 2016; (14 pgs.).
Stephan R. Richter, et al.; "Playing for Data: Ground Truth from Computer Games"; arXiv:1608.02192v1 [cs.CV]: Aug. 7, 2019; (16 pgs.).
Stephan R. Richter, et al.; "Playing for Benchmarks"; arXiv:1709.07322v1 [cs.CV]: Sep. 21, 2017; (10 pgs.).
David E. Rumelhart, et al.; "Learning Internal Representations by Error Propagation"; Parallel Distributed Processing: Explorations in the Microstructure of Cognition; vol. 1 Foundations: MIT Press; Cambridge, MA; 1986; (49 pgs.).
Christian Szegedy, et al.; "Going Deeper with Convolutions"; arXiv:1409:4842v1 [cs.CV]: Sep. 17, 2014; (12 pgs.).
Josh Tobin, et al.; "Domain Randomization for Transferring Deep Neural Networks from Simulation to the Real World"; arXiv:1703.08907v1 [cs.RO]; Mar. 20, 2017; (8 pgs.).
Jonathan Tremblay, et al., "Training Deep Networks with Synthetic Data: Bridging the Reality Gap by Domain Randomization"; arXiv:1804.06516v3 [cs.CV]; Apr. 23, 2018; (9 pgs.).
Rui Zhang, et al.; "Harmonic Unpaired Image-to-Image Translation"; arXiv:1902.09727v1 [cs.CV]; Feb. 26, 2019; (19 pgs.).
Jun-Yan Zhu, et al.; "Unpaired Image-to-Image Translation Using Cycle-Consistent Adversarial Networks"; arXiv:1703.10583v6 [cs.CV]; Nov. 15, 2018: (19 pgs.).
Yang Zou, et al.; "Unsupervised Domain Adaptation for Semantic Segmentation via Class-Balanced Self-Training": ECCV: Sep. 2018; (17 pgs.).
Extended European Search Report dated Nov. 14, 2019, in Europe Patent Application No. 19305579.5-1221; (8 pgs.).
Extended European Search Report dated Nov. 14, 2019, in Europe Patent Application No. 19305580.3-1221; (7 pgs.).

* cited by examiner

EXPERIENCE LEARNING IN VIRTUAL WORLD

CROSS-REFERENCE TO RELATED APPLICATIONS

This application claims priority under 35 U.S.C. § 119 or 365 to European Application No. 19305579.5, filed May 6, 2019. The entire contents of the above application(s) are incorporated herein by reference.

FIELD OF THE DISCLOSURE

The present disclosure relates to the field of computer programs and systems, and more specifically to methods, systems and programs of machine-learning with a dataset of scenes including spatially reconfigurable objects.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PIM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In this context and other contexts, machine-learning is gaining wide importance.

The following papers relate to this field and are referred to hereunder:

[1] A. Gaidon, Q. Wang, Y. Cabon, and E. Vig, "Virtual worlds as proxy for multi-object tracking analysis," in CVPR, 2016.
[2] S. R. Richter, V. Vineet, S. Roth, and V. Koltun, "Playing for data: Ground truth from computer games," in ECCV, 2016.
[3] M. Johnson-Roberson, C. Barto, R. Mehta, S. N. Sridhar, K. Rosaen, and R. Vasudevan, "Driving in the matrix: Can virtual worlds replace human-generated annotations for real world tasks?" in ICRA, 2017.
[4] S. R. Richter, Z. Hayder, and V. Koltun, "Playing for benchmarks," in ICCV, 2017.
[5] S. Hinterstoisser, V. Lepetit, P. Wohlhart, and K. Konolige, "On pretrained image features and synthetic images for deep learning," in arXiv:1710.10710, 2017.
[6] D. Dwibedi, I. Misra, and M. Hebert, "Cut, paste and learn: Surprisingly easy synthesis for instance detection," in ICCV, 2017.
[7] J. Tobin, R. Fong, A. Ray, J. Schneider, W. Zaremba, and P. Abbeel, "Domain randomization for transferring deep neural networks from simulation to the real world," in IEEE/RSJ International Conference on Intelligent Robots and Systems (IROS), 2017.
[8] J. Tremblay, A. Prakash, D. Acuna, M. Brophy, V. Jampani, C. Anil, T. To, E. Cameracci, S. Boochoon, and S. Birchfield, "Training deep networks with synthetic data: Bridging the reality gap by domain randomization," in CVPR Workshop on Autonomous Driving (WAD), 2018.
[9] K. He, G. Gkioxari, P. Dollar, and R. Girshick. "Mask r-cnn". arXiv:1703.06870, 2017.
[10] J. Deng, A. Berg, S. Satheesh, H. Su, A. Khosla, and L. Fei-Fei. ILSVRC-2017, 2017. URL http://www.image-net.org/challenges/LSVRC/2017/.
[11] Y. Chen, W. Li, and L. Van Gool. ROAD: Reality oriented adaptation for semantic segmentation of urban scenes. In CVPR, 2018.
[12] Y. Chen, W. Li, C. Sakaridis, D. Dai, and L. Van Gool. Domain adaptive Faster R-CNN for object detection in the wild. In CVPR, 2018.
[13] Y. Zou, Z. Yu, B. Vijaya Kumar, and J. Wang. Unsupervised domain adaptation for semantic segmentation via class-balanced self-training. In ECCV, September 2018.
[14] A. Geiger, P. Lenz, and R. Urtasun, "Are we ready for autonomous driving? The KITTI vision benchmark suite," in CVPR, 2012.
[15] A. Prakash, S. Boochoon, M. Brophy, D. Acuna, E. Cameracci, G. State, O. Shapira, and S. Birchfield. Structured domain randomization: Bridging the reality gap by contextaware synthetic data. arXiv preprint arXiv: 1810.10093, 2018.
[16] J. Deng, W. Dong, R. Socher, L.-J. Li, K. Li, and L. Fei-Fei. ImageNet: A Large-Scale Hierarchical Image Database. In CVPR09, 2009.
[17] T.-Y. Lin, M. Maire, S. Belongie, J. Hays, P. Perona, D. Ramanan, P. Dollar, and C. L. Zitnick. Microsoft COCO: Common objects in ' context. In ECCV. 2014.
[18] Shaoqing Ren, Kaiming He, Ross B. Girshick, and Jian Sun. Faster R-CNN: towards real-time object detection with region proposal networks. CoRR, abs/1506.01497, 2015.
[19] D. E. Rumelhart, G. E. Hinton, R. J. Williams, Learning internal representations by error propagation, Parallel distributed processing: explorations in the microstructure of cognition, vol. 1: foundations, MIT Press, Cambridge, Mass., 1986.
[20] Jun-Van Zhu, Taesung Park, Phillip Isola, and Alexei A. Efros. Unpaired image-to-image translation using cycle-consistent adversarial networks. CoRR, abs/1703.10593, 2017.
[21] M. Heusel, H. Ramsauer, T. Unterthiner, B. Nessler, and S. Hochreiter. Gans trained by a two time-scale update rule converge to a local nash equilibrium. In Advances in Neural Information Processing Systems (NIPS), 2017.
[22] C. Szegedy, W. Liu, Y. Jia, P. Sermanet, S. Reed, D. Anguelov, D. Erhan, V. Vanhoucke, and A. Rabinovich.

Going deeper with convolutions. In Proceedings of the IEEE Conference on Computer Vision and Pattern Recognition, pages 1-9, 2015.

Deep learning techniques have shown outstanding performances in several fields such as 2D/3D object recognition and detection, semantic segmentation, pose estimation, or motion capture (see [9, 10]). However, such techniques usually (1) require huge amounts of training data to perform at their full potential, and (2) often require expensive manual labeling (also known as annotation):

(1) Collecting hundreds of thousands of labeled data could, indeed, be very hard in several areas, such as the domain of manufacturing, health or indoor motion captures, because of data scarcity or confidentiality reasons. Publicly available datasets usually include objects of everyday life, which were labeled manually via crowdsourcing platforms (see [16, 17]).

(2) In addition to the data collection issue, labelization is very time-consuming. The annotation of the well-known ImageNet dataset (see [16]), in which, each image is labeled by "only" single label, lasted years. A pixel-wise labelling requires in average more than one hour per image. Also, manual annotation, could present several error and lack of accuracy. Some annotations require domain-specific know-how (e.g. manufacturing equipment labeling).

For all these reasons, exploiting virtual data to learn deep models has attracted increasing attention in recent years (see [1, 2, 3, 4, 5, 6, 7, 8, 15]). Virtual (also known as synthetic) data are computer-generated data that are created using a CAD or 3D modeling software rather than being generated by actual events. In fact, virtual data can be generated to meet very specific needs or conditions that are not available in existing (real) data. This can be useful when either privacy needs limit the availability or usage of the data or when the data needed for a test environment simply does not exist. Note that with virtual data, labeling comes cost-free and error-free.

However, the intrinsic domain difference between virtual and real data (also known as reality gap) could prevent the learned model to be competent for real world scenarios. This is mainly due to the overfitting problem, leading the network to learn details only present in virtual data and failing to generalize well and extract informative representation for real data.

One way that becomes recently prevalent, especially for recognition problems related to autonomous cars, is to collect photo-realistic virtual data which can be automatically annotated at a low cost, such as video game data.

For example, Richter et al. (see [2]) constructed a large scale synthetic urban scene dataset for semantic segmentation from the GTAV game. GTA-based data (see [2, 3, 4]) use a large number of assets to generate various realistic driving environments which can be automatically labeled at the pixel-level (~25 K images). Such photo-realistic virtual data often do not exist for domains other than driving and urban context. For instance, existing virtual manufacturing environments are non-photo-realistic CAD-based environments (no video games exist for the manufacturing domain), Photo realism is not required by manufacturing specifications. Furthermore, it may be confusing to have shading and lightening in such virtual environments. Therefore, all efforts are concentrated to make semantically and geometrically accurate CAD models instead of photorealistic ones. Moreover, creating photo-realistic manufacturing environments for training purposes is not pertinent due to the high variability between the different plants and factories' layouts. Unlike, urban context, in which the urban scene has strong idiosyncrasies (e.g., the size and spatial relations of buildings, streets, cars, etc.), there is no "intrinsic" spatial structure for manufacturing scenes. Note, also, that some previous work, such as VKITTI (see [1]) creates a replica of the real-world driving scenes and thus were highly correlated with those original real data and lacked variability.

Moreover, even with a high-level of realism, it was not obvious how to effectively use photo-realistic data to train neural networks to operate on real data. Often, cross-domain adaptation components (see [11, 12, 13]) are used during training the neural network, to reduce the gap between virtual and real representation.

To sum up, photo-realistic virtual datasets require either carefully designed simulation environments or the existence of annotated real data as a starting point which is not feasible in many fields such as manufacturing.

To alleviate such difficulties, Tobin et al (see [7]) introduced the concept of Domain Randomization (DR), in which realistic rendering is avoided in favor of random variation. Their approach randomly varies the texture and color of the foreground object, the background image, the number of lights in the scene, the pose of the lights, the camera position, and the foreground objects. The goal is to close the reality gap by generating virtual data with sufficient variation that the network views real-world data as just another variation. Using DR, they trained a neural network to estimate the 3D world position of various shape-based objects with respect to a robotic arm fixed to a table. Recent work (see [8]) demonstrated the ability of DR to achieve state-of-the-art in 2D bounding box detection of cars in the real-world KITTI dataset (see [14]). However, DR requires a very large amount of data to train (~100 K per object class) given the amount of variation, often the network finds it hard to learn the correct features, and the lack of context prevents DR from detecting small or occluded objects. In fact, the results of that work were limited to (1) larger cars which are (2) fully visible (KITTI Easy dataset). When used for complex inference tasks such as object detection, this approach requires sufficient pixels within the bounding box for the learned model to make a decision without the surrounding context. All these drawbacks were quantitatively confirmed in (see [15]).

To handle more challenging criteria (e.g. smaller cars, partial occlusion), the authors of [15] propose a variant of DR, in which, they leverage urban context information and the urban structure scene by placing objects randomly according to probability distributions that arise from the specific problem at hand (i.e. car detections in urban context) instead of a uniform probability distribution that was used in previous DR-based work.

Also, DR-based methods (see [5, 6, 7, 15]), mainly, focus on "easy" object classes, which have little intra-class variability (e.g. "car" class). Important intra-class variability could cause a significant performance drop of these approaches since the amount of variation to be taken into account, during data creation, could exponentially increase. This is the case of spatially reconfigurable objects, e.g. articulated objects.

Spatially reconfigurable objects or articulated objects are those that have components attached via joints and can move with respect to one another which could give each object type an infinity range of possible status.

The same problem could arise while dealing with multiple object classes (inter-class & intra-class variability).

Within this context, there is still a need for improved methods of machine learning with a dataset of scenes including spatially reconfigurable objects.

SUMMARY OF THE INVENTION

It is therefore provided a computer-implemented method of machine-learning. The method comprises providing a dataset of virtual scenes. The dataset of virtual scenes belongs to a first domain. The method further comprises providing a test dataset of real scenes. The test dataset belongs to a second domain. The method further comprises determining a third domain. The third domain is closer to the second domain than the first domain in terms of data distributions. The method further comprises learning a domain-adaptive neural network based on the third domain. The domain-adaptive neural network is a neural network configured for inference of spatially reconfigurable objects in a real scene.

The method may comprise one or more of the following:
- the determining of the third domain comprises, for each scene of the dataset of virtual scenes:
  - extracting one or more spatially reconfigurable objects from the scene; and
  - for each extracted object, transforming the extracted object into an object closer to the second domain than the extracted object in terms of data distributions;
- the determining of the third domain further comprises:
  - for each transformed extracted object, placing the transformed extracted object in one or more scenes each closer to the second domain than the first domain in terms of data distributions, the third domain comprising each scene on which the transformed extracted object is placed;
- the placing of the transformed extracted object in the one or more scenes is carried out randomly;
- the determining of the third domain comprises placing one or more distractors in each respective one of one or more scenes comprised in the third domain, a distractor being an object which is not a spatially reconfigurable object;
- the learning of the domain-adaptive neural network comprises:
  - providing a teacher extractor, the teacher extractor being a machine-learned neural network configured for outputting image representations of real scenes;
  - training a student extractor, the student extractor being a neural network configured for outputting image representations of scenes belonging to the third domain, the training of the student extractor comprising minimizing a loss which, for each scene of one or more real scenes, penalizes a disparity between a result of applying the teacher extractor to the scene and a result of applying the student extractor to the scene;
- the result of applying the teacher extractor to the scene is a first Gram matrix and the result of applying the student extractor to the scene is a second Gram matrix;
- the first Gram matrix is computed on several layers of neurons of the teacher extractor, said layers of neurons comprising at least the last layer of neurons, and the second Gram matrix is computed on several layers of neurons of the student extractor, said layers of neurons comprising at least the last layer of neurons;
- the disparity is a Euclidean distance between the result of applying the teacher extractor to the scene and the result of applying the student extractor to the scene;
- each virtual scene of the dataset of virtual scenes is a virtual manufacturing scene comprising one or more spatially reconfigurable manufacturing tools, the domain-adaptive neural network being configured for inference of spatially reconfigurable manufacturing tools in a real manufacturing scene; and/or
- each real scene of the test dataset is a real manufacturing scene in comprising one or more spatially reconfigurable manufacturing tools, the domain-adaptive neural network being configured for inference of spatially reconfigurable manufacturing tools in a real manufacturing scene.

It is further proposed a domain-adaptive neural network learnable according to the method.

It is further provided a computer program comprising instructions for performing the method.

It is further provided a device comprising a data storage medium having recorded thereon the domain-adaptive neural network and/or the computer program.

The device may form or serve as a non-transitory computer-readable medium, for example on a SaaS (Software as a service) or other server, or a cloud based platform, or the like. The device may alternatively comprise a processor coupled to the data storage medium. The device may thus form a computer system in whole or in part (e.g. the device is a subsystem of the overall system). The system may further comprise a graphical user interface coupled to the processor.

BRIEF DESCRIPTION OF THE DRAWINGS

Embodiments of the invention will now be described, by way of non-limiting example, and in reference to the accompanying drawings, where.

DETAILED DESCRIPTION

Figure 1:
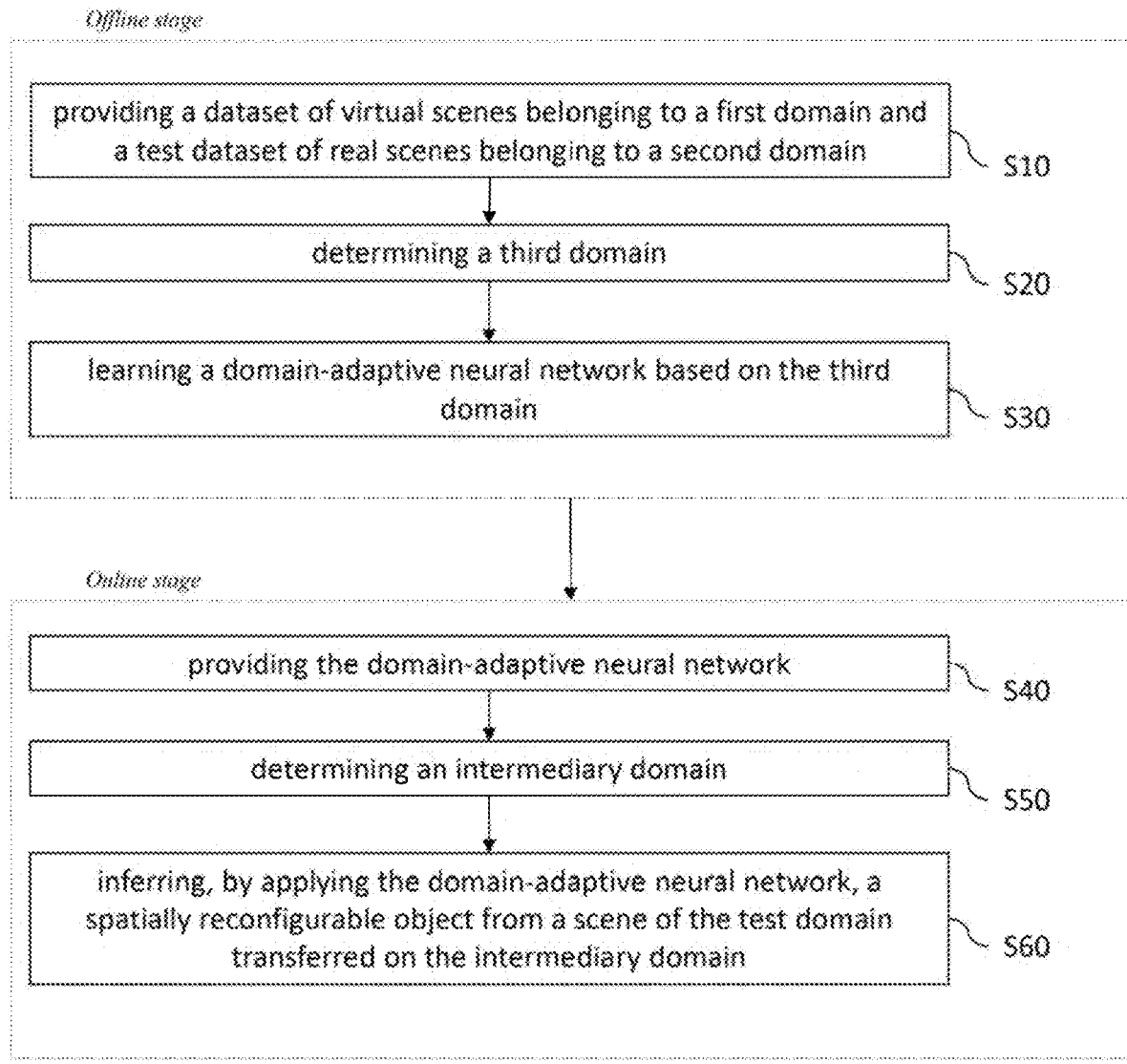
FIG. 1 shows a flowchart of a computer-implemented process integrating an example of the method.

It is provided computer-implemented methods of machine-learning with a dataset of scenes including spatially reconfigurable objects.

It is notably provided a first method of machine-learning. The first method comprises providing a dataset of virtual scenes. The dataset of virtual scenes belongs to a first domain. The first method further comprises providing a test dataset of real scenes. The test dataset belongs to a second domain. The first method further comprises determining a third domain. The third domain is closer to the second domain than the first domain in terms of data distributions. The first method further comprises learning a domain-adaptive neural network based on the third domain. The domain-adaptive neural network is a neural network configured for inference of spatially reconfigurable objects in a real scene. This first method may be referred to as "domain-adaptive learning method" in the following.

The domain-adaptive learning method forms an improved method of machine-learning with a dataset of scenes including spatially reconfigurable objects.

Notably, the domain-adaptive learning method provides a domain-adaptive neural network able to infer spatially reconfigurable objects in real scenes. This allows to use the domain-adaptive learning method in a process of inference of spatially reconfigurable objects in real scenes, for instance a process of inference of spatially reconfigurable manufacturing tools (e.g. industrial articulated robots) in real manufacturing scenes.

Furthermore, the domain-adaptive neural network may not be learned directly on a dataset of real scenes, yet the domain-adaptive neural network is still able to infer real spatially reconfigurable objects in real scenes. Such an improvement is notably accomplished by the determining of the third domain according to the domain-adaptive learning method. Indeed, the first domain, because made of virtual scenes, may be relatively far from the second domain (that is, the domain of the test dataset of the domain-adaptive neural network, which is made of real scenes) in terms of data distributions. Such reality gap may render difficult and/or inaccurate a learning of the domain-adaptive neural network which would be directly based on the dataset of virtual scenes. Such a learning could indeed result in a domain-adaptive neural network which could produce inaccurate results in terms of inference of spatially reconfigurable objects in a real scene. Instead, the domain-adaptive learning method determines a third domain closer to the second domain that the first domain, in terms of data distributions, and bases the learning of the domain-adaptive neural network on this third domain. This makes possible the learning of a domain-adaptive neural network able to infer accurately spatially reconfigurable objects in real scenes while the only dataset provided (i.e. given as input to the domain-adaptive learning method) is in fact a dataset of virtual scenes. In other words, both the learning and the learned domain-adaptive neural network are more robust.

This amounts to say that the dataset of virtual scenes is, theoretically, intended to be a training set (or a learning set) of the domain-adaptive neural network, and that the domain-adaptive learning method comprises, before the actual learning, a stage, namely the determining of the third domain, of pre-processing of the training set so as to learn the domain-adaptive neural network with the improvements previously discussed. In other words the true training/learning domain of the domain-adaptive neural network is the third domain and stems from a pre-processing of the domain originally intended to be the training/learning domain of the domain-adaptive neural network (i.e. the first domain). Nevertheless, relying on the dataset of virtual scenes as a theoretical training set (that is, to be processed before being used for the training, as previously discussed) allows to use a dataset with a large number of scenes. Indeed, generally there may be no, or at least not much, available large datasets of real scenes comprising spatially reconfigurable objects, such as manufacturing scenes comprising spatially reconfigurable manufacturing tools. Such datasets may indeed be difficult to obtain because of privacy/confidentiality issues: for instance, manufacturing scenes with spatially reconfigurable manufacturing tool such as robots are typically confidential and thus not publicly available. Furthermore, even if such a large dataset of real scene would be obtainable, it would likely contain numerous annotation (e.g. labelling) mistakes: annotating a spatially reconfigurable object (such as a manufacturing tool, e.g. a robot) may indeed difficult for a person which has not the proper skills for it, because a spatially reconfigurable object could have positions that are so numerous and/or so complex that its recognition in a real scene and its annotation by hand would require a certain amount of skills and knowledge. On the other hand, a large dataset of virtual scenes can be easily obtained, for instance by using simulation software to easily generate the virtual scenes. Besides, annotations of objects in the virtual scenes, such as spatially reconfigurable objects, are relatively easy and, most of all, can be carried out automatically and without mistakes. Indeed, the simulation software typically knows the specifications of objects pertaining to the simulations, thus their annotation can be carried out automatically by the software and with a low risk of annotation mistakes.

In examples, each virtual scene of the dataset of virtual scenes is a virtual manufacturing scene comprising one or more spatially reconfigurable manufacturing tools. In these examples, the domain-adaptive neural network is configured for inference of spatially reconfigurable manufacturing tools in a real manufacturing scene. Additionally or alternatively, each real scene of the test dataset is a real manufacturing scene comprising one or more spatially reconfigurable manufacturing tools. In such cases, the domain-adaptive neural network is configured for inference of spatially reconfigurable manufacturing tools in a real manufacturing scene.

In such examples, the domain-adaptive neural network is in any case configured for inference of spatially reconfigurable manufacturing tools (e.g. spatially reconfigurable manufacturing robots) in a real manufacturing scene. The previously-discussed improvements brought by the domain-adaptive learning method are particularly emphasized in these examples. Notably, it is difficult to rely on large a training set of real manufacturing scenes comprising spatially reconfigurable manufacturing tools, because such sets are typically confidential and/or public but poorly annotated. On the other hand, providing as a training set a large dataset of virtual manufacturing scenes comprising spatially reconfigurable manufacturing tools is particularly convenient, because such a dataset may be easily obtained and automatically annotated, for example by using a software able to generate virtual simulations in virtual manufacturing environments.

It is also provided a domain-adaptive neural network learnable according to the domain-adaptive learning method.

It is also provided a second computer-implemented method of machine-learning. The second method comprises providing a test dataset of scenes. The test dataset belongs to a test domain. The second method comprises providing a domain-adaptive neural network. The domain-adaptive neural network is a machine-learned neural network learned on data obtained from a training domain. The domain-adaptive neural network is configured for inference of spatially reconfigurable objects in a scene of the test domain. The second method further comprises determining an intermediary domain. The intermediary domain is closer to the training domain than the test domain in terms of data distributions. The second method further comprises inferring, by applying the domain-adaptive neural network, a spatially reconfigurable object from a scene of the test domain transferred on the intermediary domain. This second method may be referred to as "the domain-adaptive inferring method".

The domain-adaptive inferring method forms an improved method of machine-learning with a dataset of scenes including spatially reconfigurable objects.

Notably, the domain-adaptive inferring method allows the inference of spatially configurable objects from scenes. This allows to use the domain-adaptive inferring method in a process of inference of spatially reconfigurable objects, for instance a process of inference of spatially reconfigurable manufacturing tools (e.g. industrial articulated robots) in manufacturing scenes.

Furthermore, the method allows inference of accurately spatially reconfigurable objects from scenes of the test dataset while the domain-adaptive neural network used for such an inference has been machine-learned based on data obtained from a training domain, the training domain being possibly far from the test domain (to which the test dataset belongs) in terms of data distributions. Such an improvement is notably accomplished by the determining of the intermediary domain. Indeed, in order to better use the domain-adaptive neural network, the domain-adaptive inferring method transforms scenes of the test domain into scenes belonging to the intermediary domain, in other words scenes that are closer to learning scenes of the domain-adaptive neural network in terms of data distributions, before applying the domain-adaptive neural network for inference. In other words, the domain-adaptive inferring method allows to provide as input to the domain-adaptive neural network not directly a scene of the test domain, but a scene closer to scenes on which the domain-adaptive neural network has been learned, so as to improve the accuracy and/or quality of the outputs of the domain-adaptive neural network (which are each one or more spatially reconfigurable object inferred in a respective scene of the test domain).

The improvements brought by the domain-adaptive inferring method are thus particularly emphasized in examples where the test domain and the training domain are relatively far from each other. This may be the case for example when the training domain is made of virtual scenes and when the test domain is made of real scenes. This may also be the case for example when both the training domain and the test domain are made of virtual scenes, but the scenes of the test domain are more photo-realistic than the scenes of the training domain. In all these examples, the method comprises a stage, namely the determining of the intermediary domain, of pre-processing of scenes of the test domain which are provided as input(s) to the domain-adaptive neural network (e.g. in a testing phase of the domain-adaptive neural network), so as to bring them closer to the scenes of the training domain in terms of photo-realism (which may be quantified in terms of data distributions). As a result, the level of photo-realism of scenes which are provided as input(s) to the domain-adaptive neural network is brought closer to the photo-realism of scenes on which the domain-adaptive neural network has been learned. This ensures a better quality of the outputs of the domain-adaptive neural network (namely inferred spatially reconfigurable objects inferred on scenes of the test domain).

In examples, the training domain comprises a training dataset of virtual scenes each comprising one or more spatially reconfigurable objects. Additionally, each virtual scene of the dataset of virtual scenes may be a virtual manufacturing scene comprising one or more spatially reconfigurable manufacturing tools, the domain-adaptive neural network being in such cases configured for inference of spatially reconfigurable manufacturing tools in a real manufacturing scene. Additionally or alternatively, the test dataset comprises real scenes. In examples of such cases, each real scene of the test dataset is a real manufacturing scene comprising one or more spatially reconfigurable manufacturing tools, and the domain-adaptive neural network is configured for Inference of spatially reconfigurable manufacturing tools in a real manufacturing scene.

In these examples, the domain-adaptive neural network may be in any case configured for inference of spatially reconfigurable manufacturing tools (e.g. spatially reconfigurable manufacturing robots) in a real manufacturing scene. The previously-discussed improvements brought by the domain-adaptive inferring method are particularly emphasized in these examples. Notably, it is difficult to rely on large a training set of real manufacturing scenes comprising spatially reconfigurable manufacturing tools, because such sets are typically confidential and/or public but poorly annotated. On the other hand, using as a training set a large dataset of virtual manufacturing scenes comprising spatially reconfigurable manufacturing tools is particularly convenient, because such a dataset may be easily obtained and automatically annotated, for example by using a software able to generate virtual simulations in virtual manufacturing environments. At least for these reasons, the domain-adaptive neural network may have been learned on a training set of virtual manufacturing scenes. The previously discussed pre-processing of the test dataset, carried out by the determining of the intermediary domain, thus takes into account the training set of the domain-adaptive neural network by cleverly bringing real manufacturing scenes of the test dataset closer to the scenes of the training set in terms of data distribution, so as to ensure a better output quality of the domain-adaptive neural network.

The domain-adaptive inferring method and the domain-adaptive learning method may be performed independently. In particular, the domain-adaptive neural network provided according to the domain-adaptive inferring method may have been learned according to the domain-adaptive learning method or by any other machine-learning method. Providing the domain-adaptive neural network according to the domain-adaptive inferring method may comprise accessing, e.g. remotely through a network, a data storage medium on which the domain-adaptive neural network has been stored subsequent to its learning (e.g. according to the domain-adaptive learning method) and retrieving the domain-adaptive neural network from the database.

In examples, the data obtained from the training domain comprises scenes of another intermediary domain. In these examples, the domain-adaptive neural network has been learned on the other intermediary domain. The other intermediary domain is closer to the intermediary domain than the training domain in terms of data distributions. In such examples, the domain-adaptive neural network may be a domain-adaptive neural network learnable according to the domain-adaptive learning method. The test dataset according to the domain-adaptive learning method may equal the test dataset according to the domain-adaptive inferring method, and the test domain according to the domain-adaptive inferring method may equal the second domain according to the domain-adaptive learning method. The training domain according to the domain-adaptive inferring method may equal the first domain according to the domain-adaptive learning method, and the data obtained from the training domain may belong to (e.g. form) the third domain determined according to the domain-adaptive learning method. The other intermediary domain may be the third domain determined according to the domain-adaptive learning method.

Such examples combine the previously discussed improvements brought by the domain-adaptive learning method and by the domain-adaptive inferring method: the use of a large dataset of virtual scenes rightly annotated as a training set of the domain-adaptive neural network, the pre-processing stage of the training set carried out by the determining of the third domain (or the another intermediary domain), which improves the quality and/or the accuracy of the output of the domain-adaptive neural network, and the pre-processing stage of the test dataset of real scenes carried out by the determining of the intermediary domain, which further improves the quality and/or the accuracy of the output of the domain-adaptive neural network.

The domain-adaptive learning method and the domain-adaptive inferring method may alternatively be integrated to a same computer-implemented process. FIG. 1 shows a flowchart illustrating the process, which is now discussed.

The process comprises an offline stage integrating the domain-adaptive learning method. The offline stage comprises the providing S10 of a dataset of virtual scenes and of a test dataset of real scenes according to the domain-adaptive learning method. The dataset of virtual scenes belongs to a first domain, which forms (in theory, as previously explained) a training domain of the domain-adaptive neural network learned according to the domain-adaptive learning method. The test dataset of real scenes belongs to a second domain, which forms a test domain of the domain-adaptive neural network learned according to the domain-adaptive learning method. The offline stage further comprises the determining S20 of the third domain according to the domain-adaptive learning method. The third domain is closer to the second domain than the first domain in terms of data distributions. The offline stage further comprises the learning 30 of the domain-adaptive neural network according to the domain-adaptive learning method.

After the offline stage, it is thus provided by the process the domain-adaptive neural network learned according to the domain-adaptive learning method. The domain-adaptive neural network may in other words form an output of the offline stage. The offline stage may be followed by a stage of storing the learned domain-adaptive neural network, e.g. on a data storage medium of a device.

The process further comprises an online stage integrating the domain-adaptive inferring method. The online stage comprises the providing S40 the domain-adaptive neural network learned during the offline stage according to the domain-adaptive inferring method. Notably, the providing S40 of the domain-adaptive neural network may comprise accessing, e.g. remotely through a network, a data storage medium on which the domain-adaptive neural network has been stored at the end of the offline stage and retrieving the domain-adaptive neural network from the database. The online stage further comprises the determining S50 of an intermediary domain according to the domain-adaptive inferring method. The intermediary domain is closer to the first domain than the second domain in terms of data distributions. It is to be understood that, in the context of the process: the first domain of the domain-adaptive learning method is the training domain of the domain-adaptive inferring method, the second domain of the domain-adaptive learning method is the test domain of the domain-adaptive inferring method, the test dataset of the domain-adaptive learning method is the test dataset of the domain-adaptive inferring method, and the data obtained from the training domain domain-adaptive inferring method belongs to (e.g. forms) the third domain. The online stage may further comprise the inferring S60 of a spatially reconfigurable object according to the domain-adaptive inferring method.

The process combines the previously discussed improvements brought by the domain-adaptive learning method and by the domain-adaptive inferring method: the use of a large dataset of virtual scenes rightly annotated as a training set of the domain-adaptive neural network, the pre-processing stage of the training set carried out by the determining of the third domain, which improves the quality and/or the accuracy of the output of the domain-adaptive neural network, and the pre-processing stage of the test dataset of real scenes carried out by the determining of the intermediary domain, which further improves the quality and/or the accuracy of the output of the domain-adaptive neural network.

The process may constitute a process of inference of spatially reconfigurable manufacturing tools (e.g. spatially reconfigurable manufacturing robots) in real manufacturing scenes. Indeed, in examples of the process, the virtual scenes of the first domain may be each virtual manufacturing scenes comprising one or more spatially reconfigurable manufacturing tools and the real scenes of the second domain may be each real manufacturing scenes comprising one or more spatially reconfigurable manufacturing tools. The domain-adaptive neural network learned during the offline stage is thus in these examples configured for inference of spatially reconfigurable manufacturing tools in real manufacturing scenes. The offline stage beneficiates from the previously discussed improvement provided by the domain-adaptive learning method in the particular case of inference of manufacturing tools: the virtual manufacturing scenes are easy to obtain in a large quantity and rightly annotated, while the previously-discussed pre-processing of the training set allows to bring closer the scenes of the training set to the real scenes of the test dataset, which improves robustness and accuracy of the learned domain-adaptive neural network. Combined with these improvements are those brought by the domain-adaptive inferring method integrated in the online stage of the process. These improvements comprise the previously-discussed pre-processing of the test dataset so as to bring the real scenes of the test dataset closer to the scenes of the third domain, on which the domain-adaptive neural network has been learned at the offline stage, thereby improving the quality of the output of the domain-adaptive neural network. As a result, the inferring S60 of spatially reconfigurable manufacturing tools in real manufacturing scenes at the online stage is particular accurate and robust. The process may thus constitute a particularly robust and accurate process of inference of spatially reconfigurable manufacturing tools in real manufacturing scenes.

The domain-adaptive learning method, the domain-adaptive inferring method, and the process are computer-implemented. The notion of computer-implemented method (resp. process) is now discussed.

By "a method (resp. process) is computer-implemented", it is meant that steps (or substantially all the steps) of the method (resp. process) are executed by at least one computer, or any system alike. Thus, steps of the method (resp. process) are performed by the computer, possibly fully automatically, or, semi-automatically. In examples, the triggering of at least some of the steps of the method (resp. process) may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method (resp. process) is to perform the method (resp. process) with a system adapted for this purpose. The system may comprise a processor coupled to a memory and a graphical user interface (GUI), the memory having recorded thereon a computer program comprising instructions for performing the method (resp. process). The memory may also store a database. The memory is any hardware adapted for such storage, possibly comprising several physical distinct parts (e.g. one for the program, and possibly one for the database).

Figure 5:
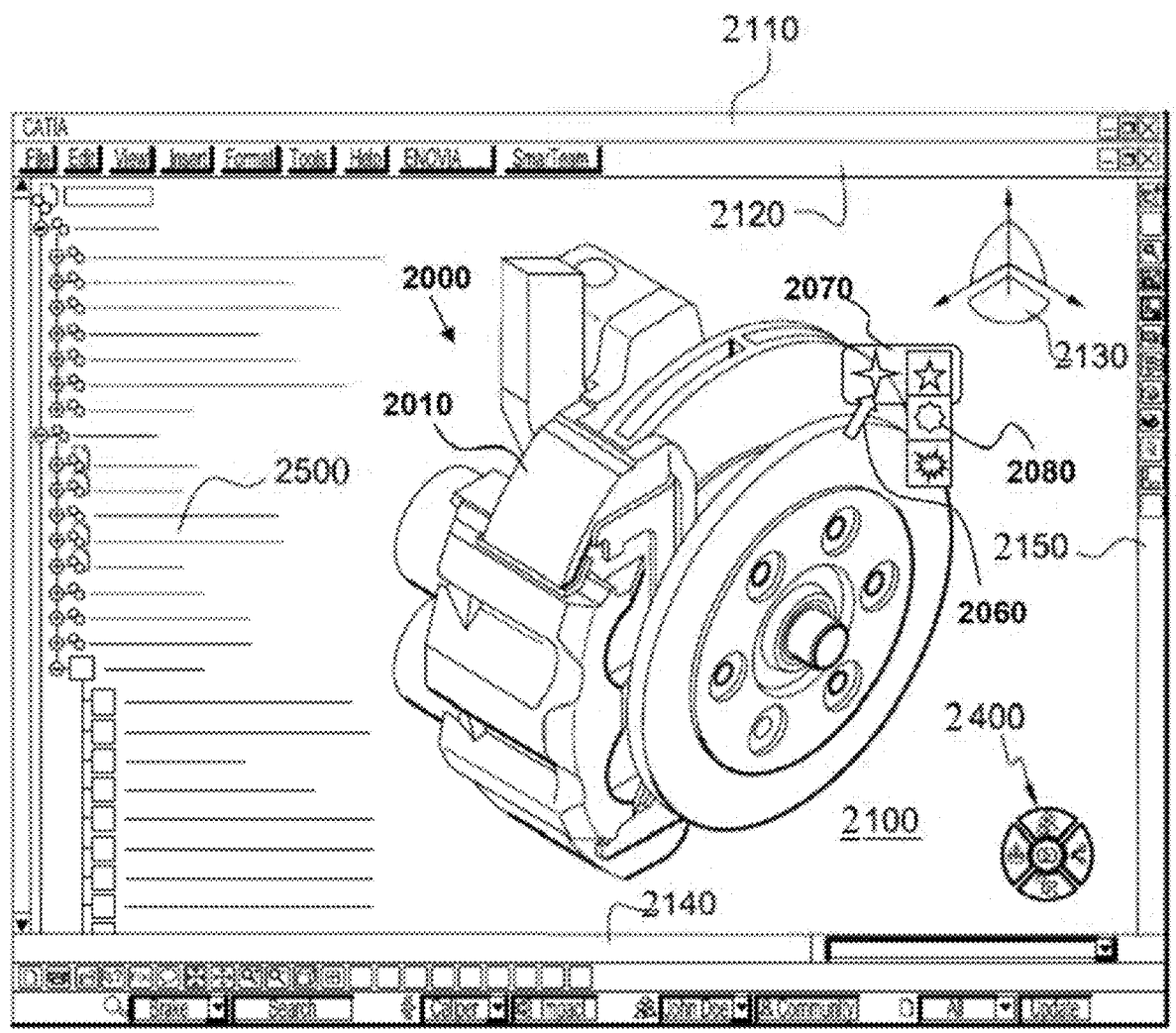
FIG. 5 shows an example of a graphical user interface of the system.

FIG. 5 shows an example of the GUI of the system, wherein the system is a CAD system.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of the figure, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 6:
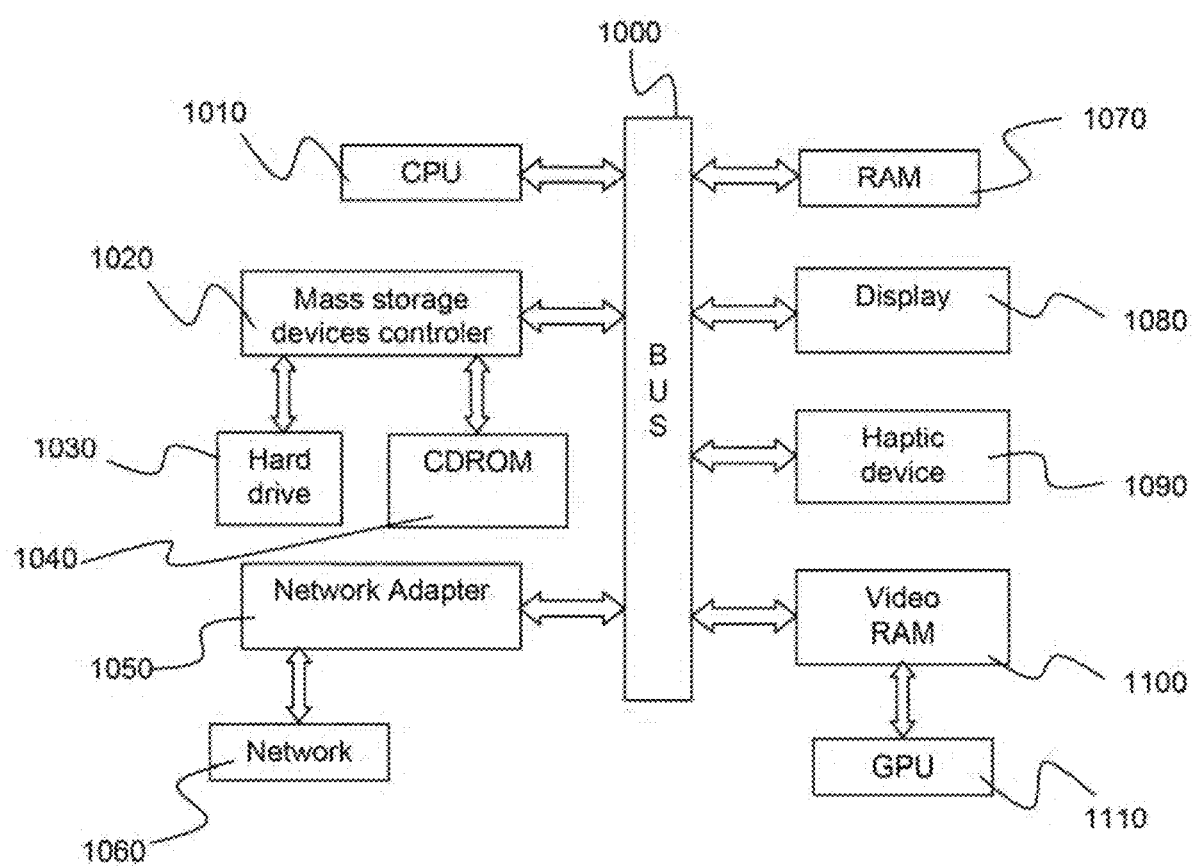
FIG. 6 shows an example of the system.
Figure 7:
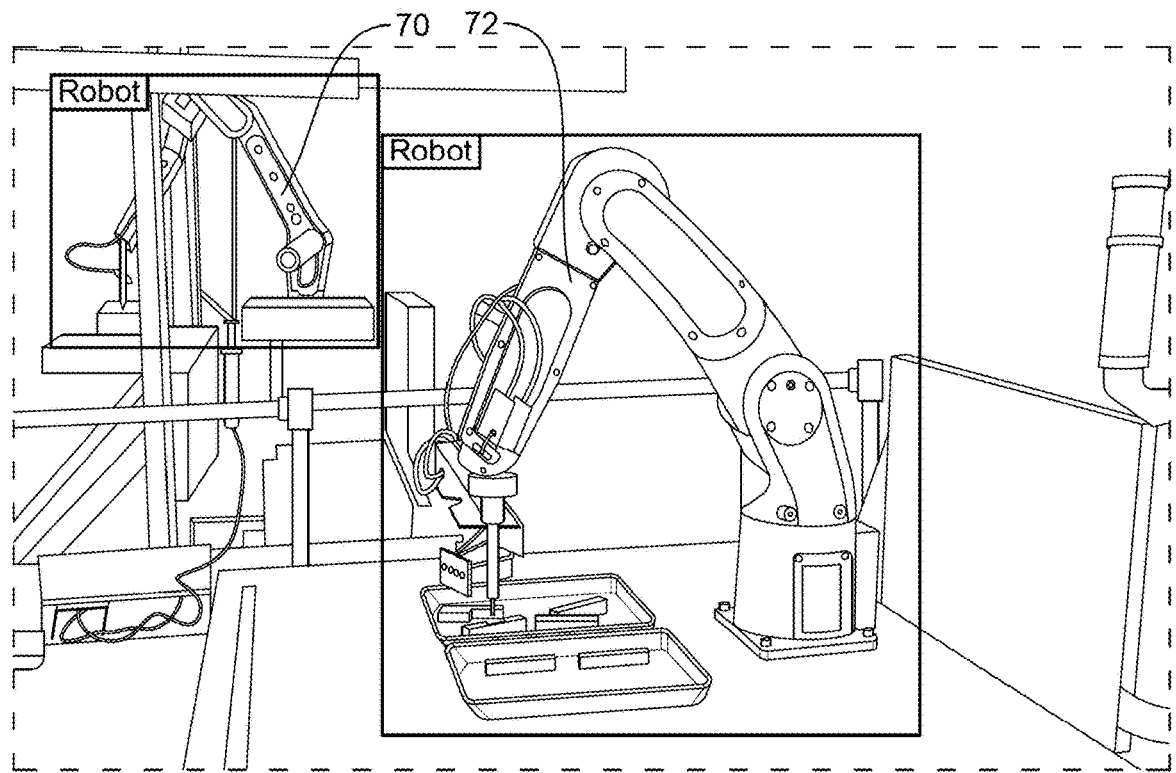
FIGS. 7, 8, 9, 10, 11, 12, 13, 14, 15, 16, 17, 18, 19, 20, 21, 22, 23, 24, 25, 26, 27, 28, 29, 30, 31 and 32 illustrate the process and/or the method.
Figure 8:
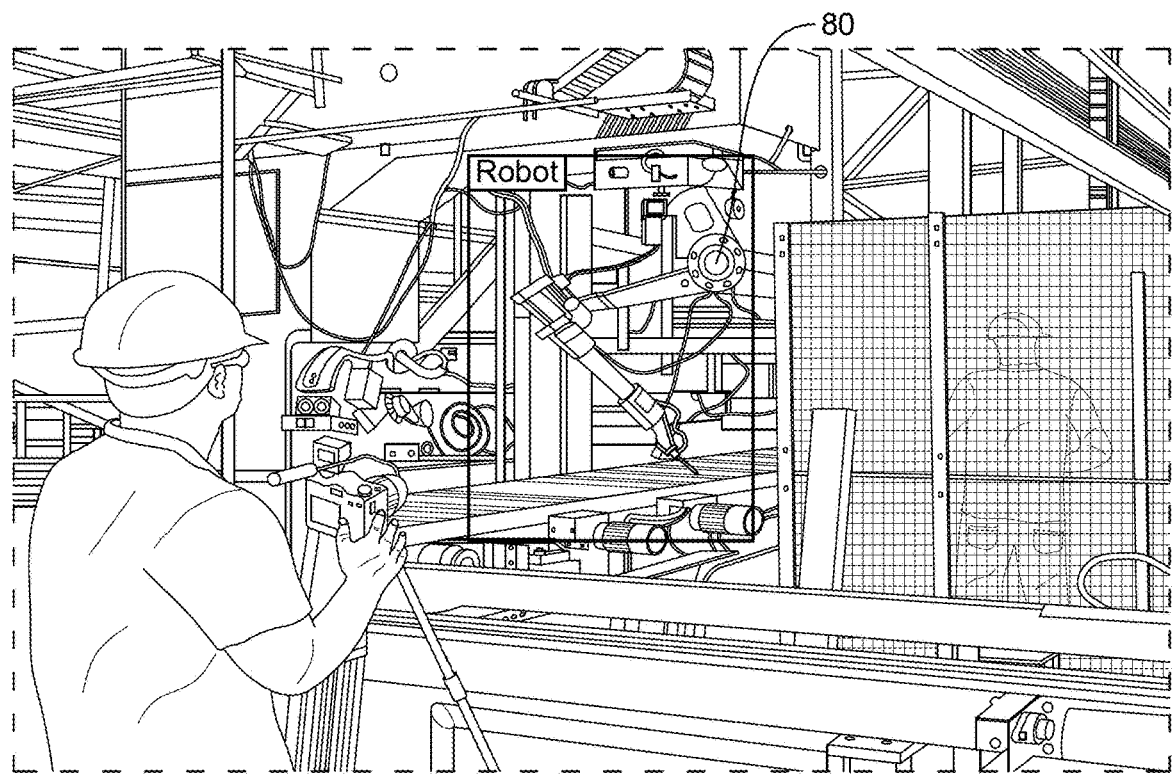
Figure 9:
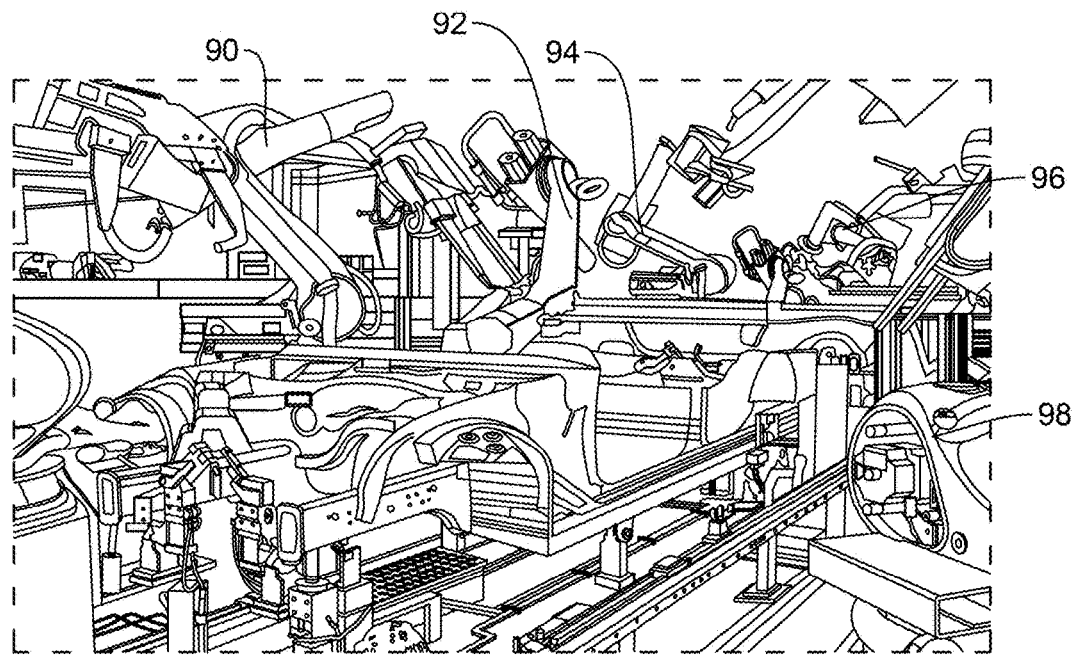
Figure 10:
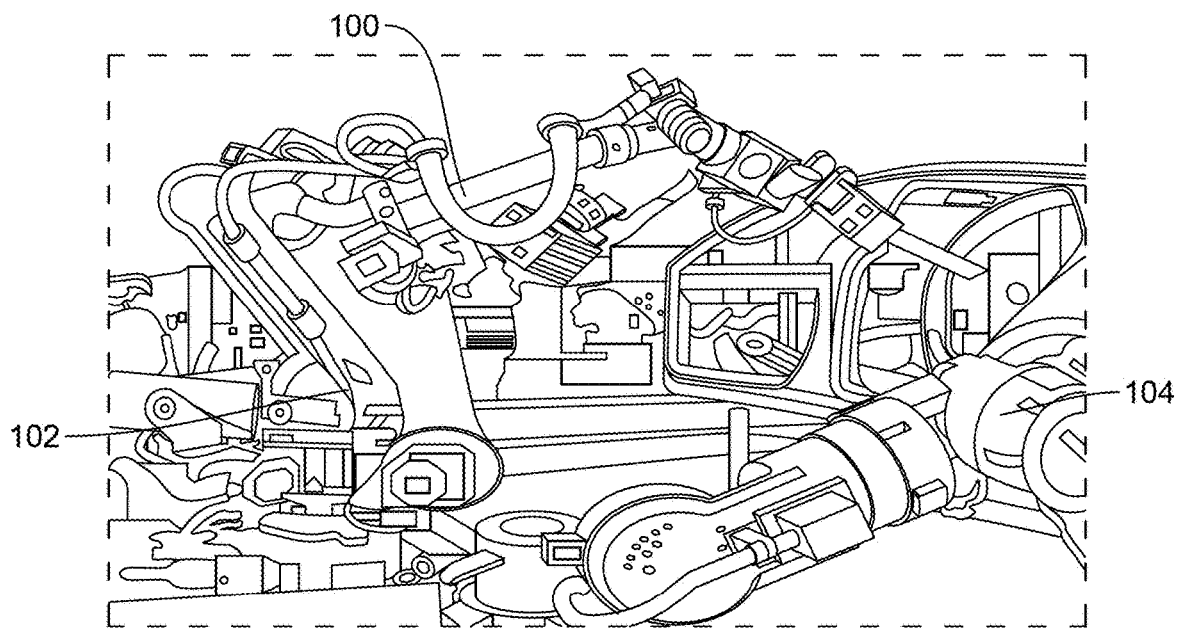
Figure 11:
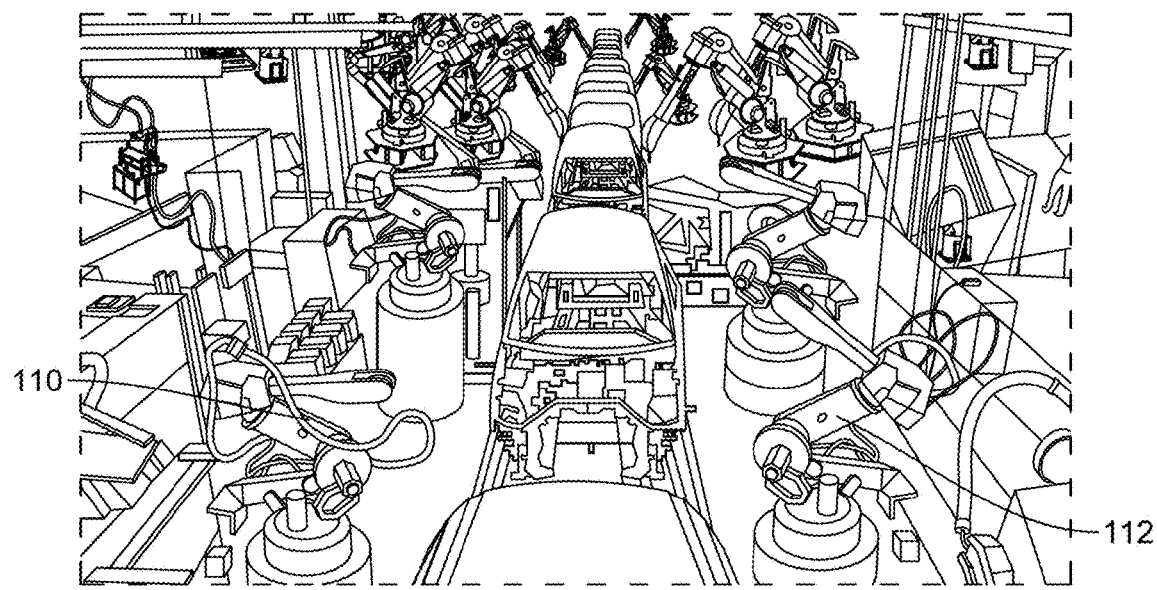
Figure 12:
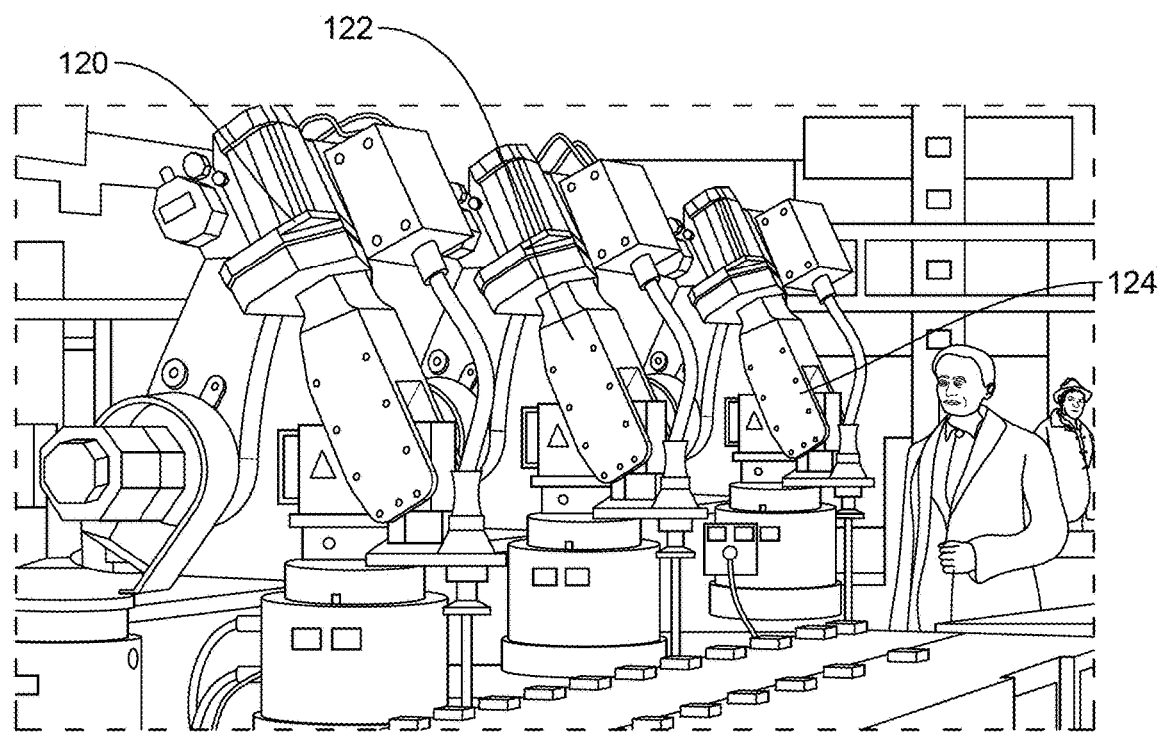
Figure 13:
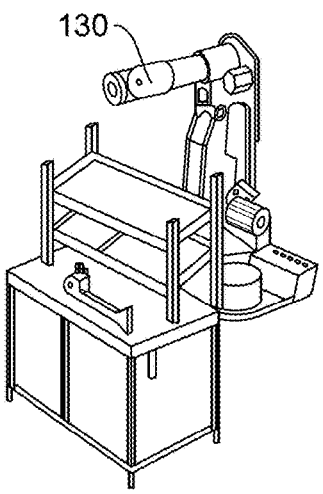
Figure 14:
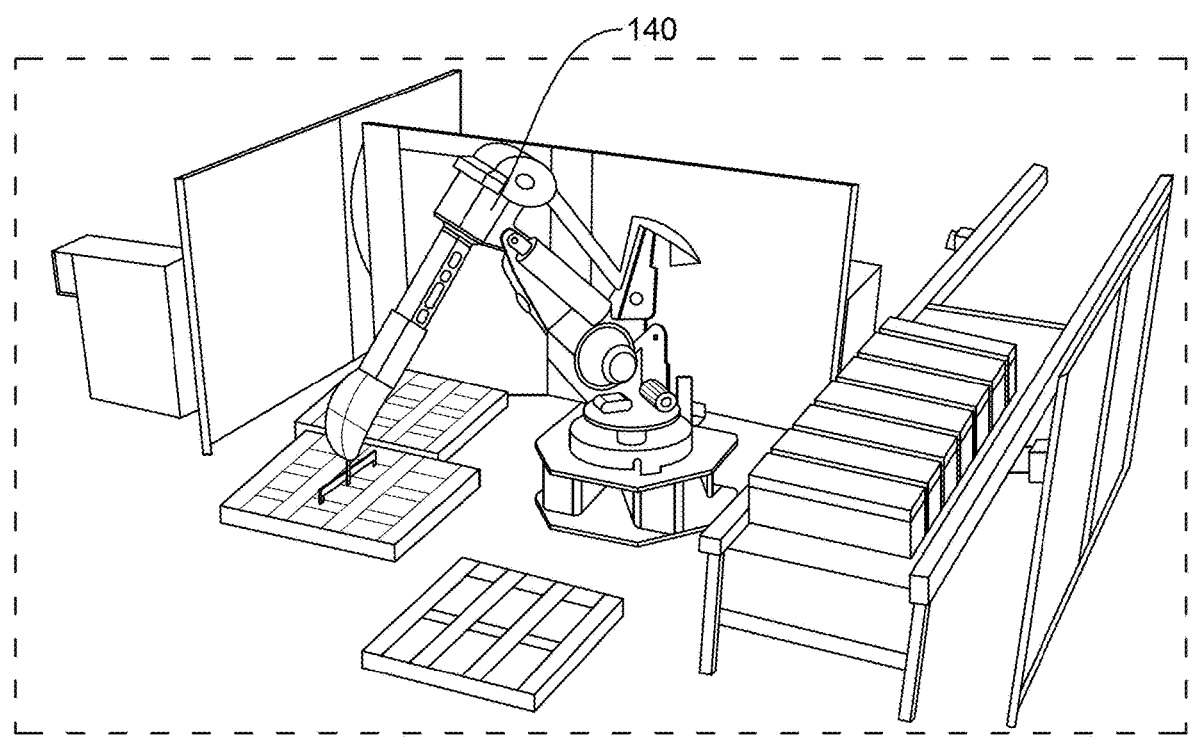
Figure 15:
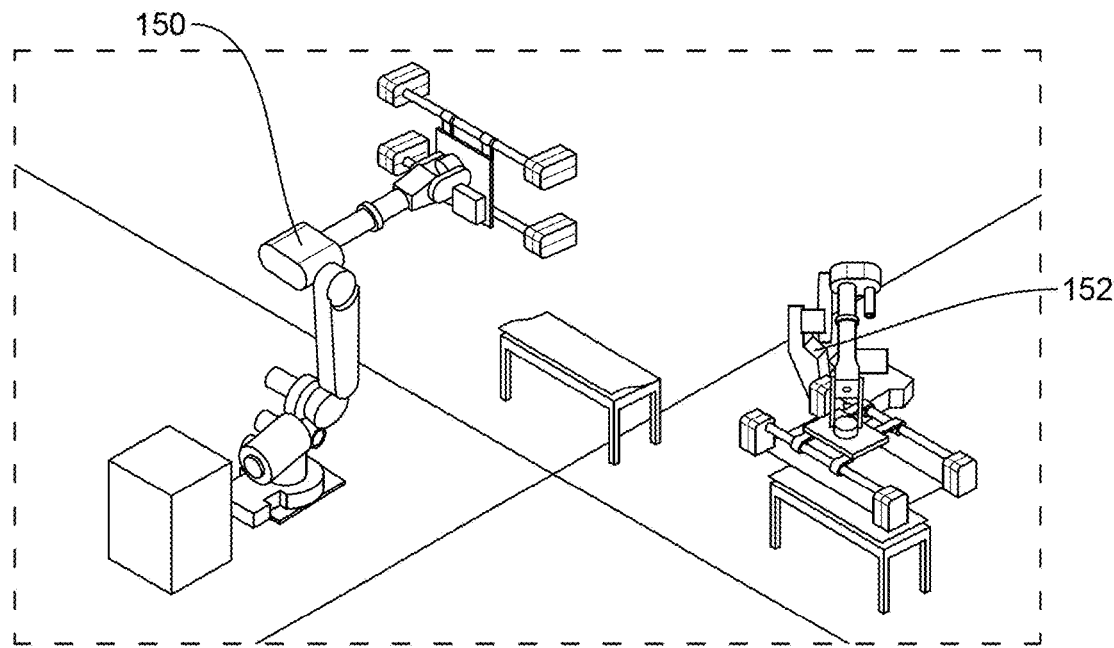
Figure 16:
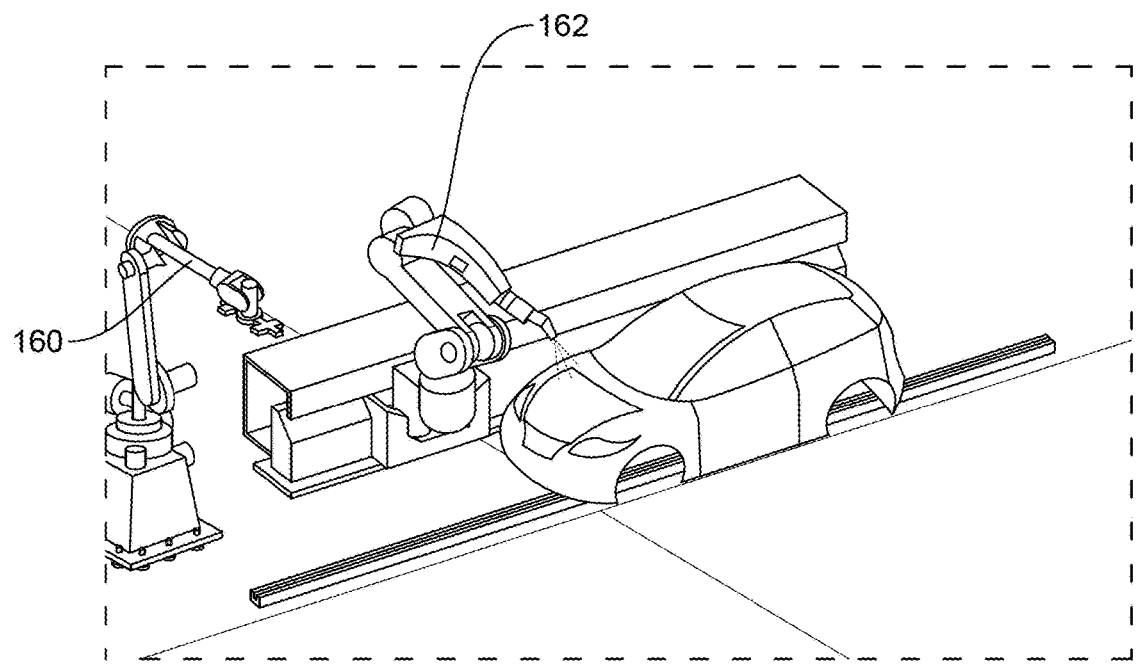
Figure 17:
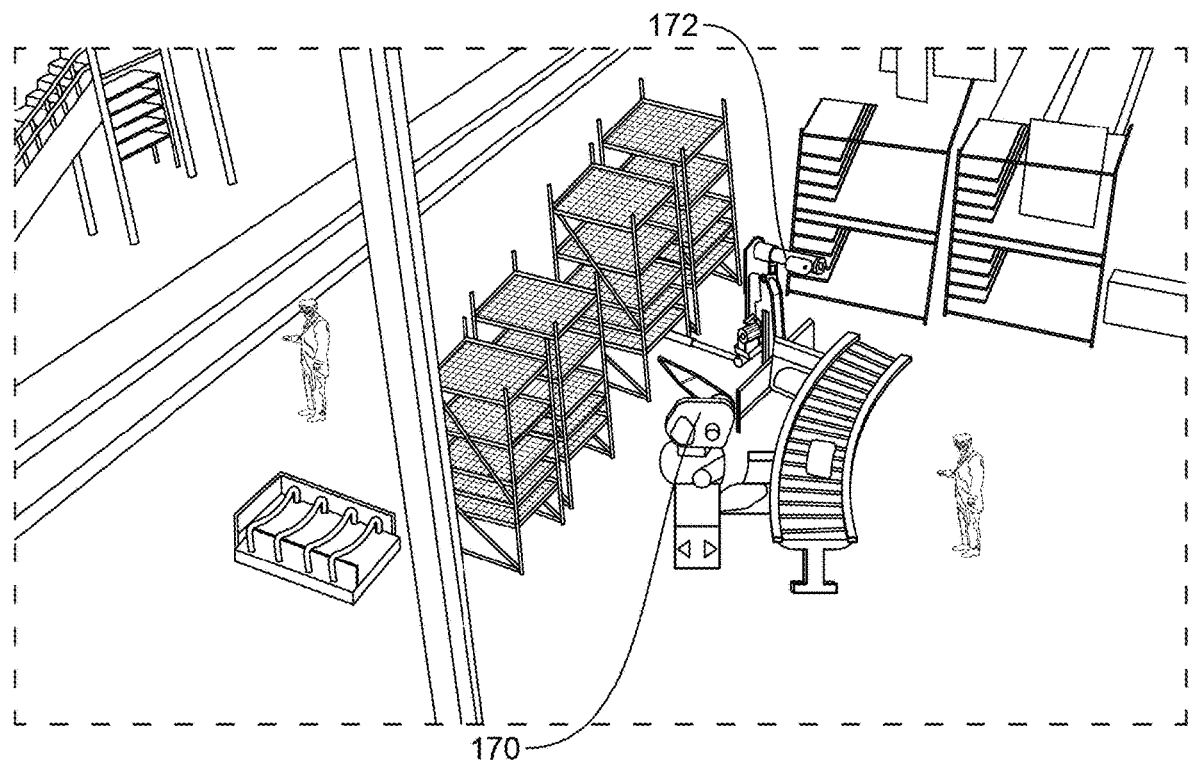

FIG. 6 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the domain-adaptive learning method, domain-adaptive inferring method and/or the process. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Process/method steps (that is steps of the domain-adaptive learning method, domain-adaptive inferring method and/or the process) may be performed by a programmable processor executing a program of instructions to perform functions of the process by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the domain-adaptive learning method, domain-adaptive inferring method and/or the process.

The concept of providing a dataset of scenes, involved in the domain-adaptive learning method, domain-adaptive inferring method and the process, will be discussed. Prior to the discussion of this concept, data structures involved therein are now discussed. As will be recognized, the data structure definitions and examples provided herein may apply to at least part (e.g. all) of any dataset provided the domain-adaptive learning method, domain-adaptive inferring method and/or the process.

In the context of the present disclosure, a scene designates an arrangement (e.g. a disposition) of one or more objects in a background at a point in time. The background typically represents a real-world physical environment, the objects typically represent real-world physical object, and the arrangement of the objects typically represents a disposition of the real-world objects in the real-world environment at the point in time. This amounts to say that a scene is a representation at one point in time of real-world objects in their real-world environment. This representation may be real, geometrically realistic, semantically realistic, photo-realistic, and/or virtual. The concepts of real, geometrically realistic, semantically realistic, photo-realistic and virtual scenes will be discussed hereinafter. A scene is typically (but not always) three-dimensional. In the following, the distinction between a scene (e.g. virtual or real) and its representation (e.g. by a virtual or a real image) will not be made, for the sake of simplicity.

In the context of the present disclosure a dataset of scenes typically comprises a large number of scenes, for example higher than 1000, 10000, 100000, or 1000000 scenes. Any dataset of scenes of the present disclosure may be made or substantially made of scenes which are from a same context (e.g. manufacturing scenes, construction site scenes, harbor scenes, or tarmac scenes). The scenes which are involved in the domain-adaptive learning method, in the domain-adaptive inferring method and/or the process may in fact be all scenes form a same context (e.g. manufacturing scenes, construction site scenes, harbor scenes, or tarmac scenes)

Any scene involved in the domain-adaptive learning method, in the domain-adaptive inferring method and/or the process may comprise one or more spatially reconfigurable objects. An object which is spatially reconfigurable is an object comprising several (e.g. mechanical) parts, the object being characterized in that there exists one or more semantically realistic spatial relationships between said parts of the object. A spatially reconfigurable object may typically be a (e.g. mechanical) assembly of parts physically linked to each other, the assembly having at least one degree of freedom. By this it is meant that at least a first part of the object is movable relative to at least a second part of the object while both the at least first part and the at least second part remain physically attached to the assembly. For example, the at least first part may be translated and/or rotated relatively to the at least second part. A spatially reconfigurable object may therefore have a very large number of spatial configurations and/or positions, which makes the object difficult to identify, and e.g. to label, for a person not having the proper skills. In the context of the present disclosure, a spatially reconfigurable object may be a spatially reconfigurable manufacturing tool (such as an industrial articulated robot) in a manufacturing scene, a crane in a construction site scene, an aerial passageway in a tarmac scene or a port crane in a harbor scene.

In the context of the present disclosure, a scene may be a manufacturing scene. A manufacturing scene is a scene representing real-world objects in a real-world manufacturing environment. A manufacturing environment may be a plant or a part of a plant. An object in the plant or the part of the plant may be a manufactured product, i.e. a product already manufactured by one or more manufacturing processes carried out at the plant at the point in time pertaining to the scene. An object in the plant or the part of the plant may also be a product being manufactured, i.e. a product being manufactured by one or more manufacturing processes carried out at the plant at the point in time pertaining to the scene. An object in the plant or the part of the plant may also be a (e.g. spatially reconfigurable) manufacturing tool, that is a tool involved in one or more manufacturing process carried out at the plant. An object in the plant may also be an object constitutive of the background of the plant.

In other words, a scene representing a plant, or a part of the plant, may thus comprise one or more products, each being in the process of being manufactured or being already manufacture by one or more manufacturing processes of the plant, and one or more manufacturing tools, e.g. each involved in the manufacturing of one or more of said products. A product may typically be a (e.g. mechanical) part or assembly of parts (or equivalently an assembly of parts, as the assembly of parts may be seen as a part itself from the point of view of the present disclosure).

A mechanical part may be a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product, articulated and/or reconfigurable manufacturing equipment such as a robotic arm), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

A mechanical part may also be one or a plausible combination of: a molded part (i.e. a part manufactured by a molding manufacturing process), a machined part (i.e. a part manufactured by a machining manufacturing process), a drilled part (i.e. a part manufactured by a drilling manufacturing process), a turned part (i.e. a part manufactured by a turning manufacturing process), a forged part (i.e. a part manufactured by a forging manufacturing process), a stamped part (i.e. a part manufactured by a stamping manufacturing process) and/or a folded part (i.e. a part manufactured by a folding manufacturing process).

A manufacturing tool may be any one of:

a machining tool (i.e. a tool carrying out at least a part of a machining process), such as a broaching machine, a drill press, a gear shaper, a hobbing machine, a hone, a lathe, a screw machine, a milling machine, a sheet metal shear), a shaper, a saw, a planer, a Stewart platform mill, a grinding machine, a multitasking machine tool (e.g. with many axes that combine turning, milling, grinding, and/or material handling into one highly automated machine tool);

a compression molding machine (i.e. a machine carrying out at least a part of a compression molding process), typically comprising at least a mold or a molding matrix such as a flash plunger-type mold, straight plunger-type, or a landed plunger-type mold;

an injection molding machine (i.e. a machine carrying out at least a part of an injection molding process), such as a die casting machine, a metal injection molding machine, a plastic injection molding machine, a liquid silicon injection molding machine, or a reaction injection molding machine;

a rotary cutting tool (e.g. carrying out at least a part of a drilling process), such as a drill bit, a countersink, a counterbore, a tap, a die, a milling cutter, a reamer, or a cold saw blade;

a non-rotary cutting tool (e.g. carrying out at least a part of a turning process), such as a tipped tool or a form tool;

a forging machine (i.e. carrying out at least a part of a forging process), such as a mechanical forging press (typically comprising at in least one forging die), a hydraulic forging press (typically comprising at least one forging die), a forging hammer powered by compressed air, a forging hammer powered by electricity, a forging hammer powered by hydraulics, or a forging hammer powered by steam;

a stamping machine (i.e. carrying out at least a part of a stamping process), such as a stamping press, a machine press, a punching machine, a blanking machine, an embossing machine, a bending machine, a flanging machine, or a coining machine;

a bending or folding machine (i.e. carrying out at least a part of a bending or folding process), such box and pan brake, a press brake, a folder, a panel bender or a machine press;

a spot welding robot; or an electrical painting tool (i.e. carrying out at least a part of a painting process of a product), such as a (e.g. electrical) automotive painting robot.

Any one of the manufacturing tools listed above may be a spatially reconfigurable manufacturing tool, i.e. a manufacturing tool that is spatially reconfigurable, or may form at least a part of a spatially reconfigurable manufacturing tool. For example, a manufacturing tool held by a tool-holder of a spatially reconfigurable manufacturing tool forms at least a part of the spatially reconfigurable manufacturing tool. A spatially reconfigurable manufacturing tool, such as any one of the tools listed above, may be a manufacturing robot such as an (e.g. articulated) industrial robot.

The concept of real scene is now discussed. As previously said, a scene represents a disposition of real-world objects in a real-world environment (i.e. the background of the scene). The scene is real when the representation of the disposition is a physical arrangement that stems from an acquisition of the same physical arrangement as it is in the real-world. The acquisition may be carried out by a digital image acquisition process, which creates a digitally encoded representation of the visual characteristics of the physical arrangement of the objects in their environment. Such a digitally encoded representation may be referred to as "an image" or "a digital image" in the following, for the sake of simplicity. The digital image acquisition process may optionally comprise the processing, the compression and/or the storage of such images. A digital image may be created directly from a physical environment by a camera or similar device, a scan or similar device, and/or a video-camera or similar device. Alternatively, a digital image may be obtained from another image in a similar medium, such as photographs, photographic film (e.g. the digital image is a snapshot of an instant of the film), or printed paper, by an image scanner or similar device. A digital image may also be obtained by processing of non-image data, such as those acquired with tomographic equipment, scans, side-scan sonar, radio telescopes, X-ray detectors and/or photostimulable phosphor plate (PSP). In the context of the present disclosure, a real manufacturing scene may for example stem from a digital image obtained by a camera (or similar device) located in a plant. Alternatively, the manufacturing scene may stem from a snapshot of a film acquired by one or more video-cameras located at the plant.

FIGS. 7 to 12 show examples of real manufacturing scenes, each respectively comprising the articulated industrial robots 70 and 72, 80, 90, 92, 94, 96 and 98, 100, 102 and 104, 110 and 112, 120, 122 and 124.

The concept of virtual scene is now discussed. A scene is virtual when it stems from computer-generated data. Such a data may be generated by a (e.g. 3D) simulation software, a (e.g. 3D) modelling software, a CAD software, or a video game. This amounts to say that the scene itself is computer-generated. An object of a virtual scene may be placed in a realistic position in a virtual scene. Alternatively, an object of a virtual scene may be placed in a non-realistic position in a virtual scene, for example when said object is placed randomly in an already existing virtual scene, as notably discussed hereinafter. This amounts to say that a virtual scene represents a disposition of virtual objects (e.g. virtual representations of real-world objects) in a virtual background (e.g. a virtual representation of a real-world environment). Said disposition may be physically realistic for at least a part of the virtual objects, i.e. the disposition of the virtual objects of said at least a part represent a real-world physical arrangement of real-world objects. Additionally or alternatively, at least another part of the virtual objects may be disposed (e.g. relative to each other and/or relative to objects of said at least a part) in a non-realistic disposition (i.e. not corresponding to a real-world physical arrangement), for example when virtual objects of said at least a part are placed or disposed randomly, as notably discussed hereinafter. Any object of a virtual scene may be automatically annotated or labelled. The concept of labelling an object will be further discussed hereinbelow. A virtual manufacturing scene may be generated by a 3D modelling software for manufacturing environment, a 3D simulation software for manufacturing environment or a CAD software. Any object in a virtual manufacturing scene (such as a product or manufacturing tool) may be represented virtually by a 3D modeled object representing a skin (e.g. outer surface) of a solid (e.g. a B-rep model). The 3D modeled object may have been designed by a user with a CAD system and/or may stem from a virtual manufacturing simulation executed by a 3D simulation software for manufacturing environment.

A modeled object is any object defined by data stored e.g. in the database. By extension, the expression "modeled object" designates the data itself. According to the type of the system performing the domain-adaptive learning method, the domain-adaptive inferring method and/or the process, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus, allowing decision on management or required investment. CAM is a subsequent process after a CAD process and potential CAE process.

Such CAM solutions are provided by Dassault Systèmes under the trademark DELMIA®.

In the context of CAD, a modeled object may typically be a 3D modeled object, e.g. representing a product such as a part or an assembly of parts, or possibly an assembly of products. By "30 modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 30 modeled. The display of a 3D representation facilitates design (i.e. increases the speed at which designers statistically accomplish their task). This speeds up the manufacturing process in the industry, as the design of the products is part of the manufacturing process.

FIGS. 13 to 17 illustrate virtual manufacturing scenes, each respectively comprising the virtual articulated industrial robots 130, 140, 150 and 152, 160 and 162, and 170 and 172.

A virtual scene may be geometrically and semantically realistic, which means that the geometry and the functionalities of virtual objects in the scene (such as a product or a manufacturing tool in a manufacturing scene) are realistic, e.g. represent realistically the corresponding geometry and functionalities as they are in the real-world. A virtual scene may be geometrically and semantically realistic without being photo-realistic. Alternatively, a virtual scene may be geometrically and semantically realistic, and also photo-realistic.

The concept of photo-realistic image can be understood in terms of a number of visible features such as: Shading (i.e. how the colour and brightness of a surface varies with lighting), Texture-mapping (i.e. a method of applying detail to surfaces), Bump-mapping (i.e. a method of simulating small-scale bumpiness on surfaces), Fogging/participating medium (i.e. how light dims when passing through non-clear atmosphere or air), Shadows (i.e. the effect of obstructing light), Soft shadows (i.e. varying darkness caused by partially obscured light sources), Reflection (i.e. mirror-like or highly glossy reflection), Transparency or opacity (i.e. sharp transmission of light through solid objects), Translucency (i.e. highly scattered transmission of light through solid objects), Refraction (i.e. bending of light associated with transparency), Diffraction (i.e. bending, spreading, and interference of light passing by an object or aperture that disrupts the ray), Indirect illumination (i.e. surfaces illuminated by light reflected off other surfaces, rather than directly from a light source, also known as global illumination), Caustics (i.e. a form of indirect illumination, reflection of light off a shiny object, and/or focusing of light through a transparent object, to produce bright highlights on another object), Depth of field (i.e. objects appear blurry or out of focus when too far in front of or behind the object in focus) and/or Motion blur (i.e. objects appear blurry due to high-speed motion, or the motion of the camera). The presence of such characteristics makes such data (i.e. corresponding to or from which stems the virtual photo-realistic scene) have similar distribution to real data (from which stems an image representing a real scene). In this context, the more a virtual set distribution is close to real world data, the more photo-realistic it looks.

The concept of data distribution is now discussed. In the context of building machine learning (ML) model, it is often desirable to train the model on and test it against data that come from the same distribution. In probability theory and statistics, a probability distribution is a mathematical function that provides the probabilities of occurrence of different possible outcomes in an experiment. In other words, the probability distribution is a description of a random phenomenon in terms of the probabilities of events. A probability distribution is defined in terms of an underlying sample space, which is the set of all possible outcomes of the random phenomenon being observed. The sample space may be the set of real numbers or a higher-dimensional vector space, or it may be a list of non-numerical values. It is understandable that when training on virtual data and testing on real data, one faces the distribution shift problem. As modifying virtual images with real images for tackling the shift problem, the domain-adaptive learning method, the domain-adaptive inferring method and/or the process may transform the distribution of virtual data to better align with the distribution of real data. To quantify how well the two distributions align, several approaches can be used. For the sake of illustration, below are two examples of approaches.

Figure 18:
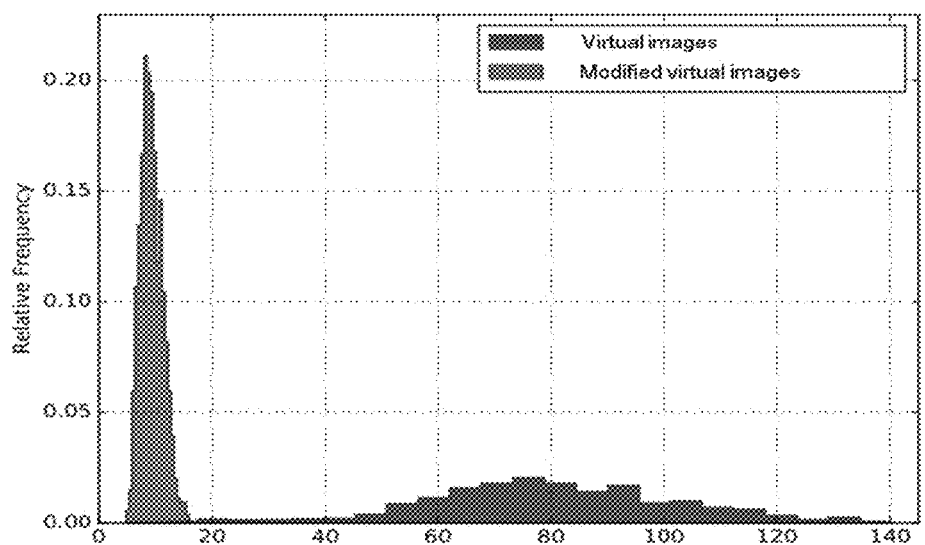

The first approach is a Histogram approach. Consider the case of creating N image pairs. Each image pair consists of a first created virtual image, and of a second one that corresponds to a real image representing the same scene that the first virtual image, the real image being obtained by using a virtual-to-real generator. In order to evaluate the relevance of modifying the training data, the domain-adaptive learning method, the domain-adaptive inferring method and/or the process quantify how well the virtual image distribution aligns with real world data before and after the synthetic-to-real modification. To do so, the domain-adaptive learning method, the domain-adaptive inferring method and/or the process may consider a set of real images and compute the Euclidean distance between the mean image of real data and the virtual data before and after the synthetic-to-real modification. Formally, consider $D^v=\{v_1, \ldots, v_N\}$ and $D^{v'}=\{v'_1, \ldots, v'_N\}$ the deep features derived from a pre-trained network, e.g. trained on the ImageNet classification task, (the inception network, see [22]) of the virtual images respectively before and after modification. By denoting the deep features derived from the mean image of the real data set with $m_{real}$, the Euclidean differences are $ED^v=\{v_1-m, \ldots, v_N-m\}$ and $ED^{v'}=(v'_1-m, \ldots, v'_N-m)$. To assess the alignment with the real data distribution, the domain-adaptive learning method, the domain-adaptive inferring method and/or the process compare the distributions of $ED^v$ and $ED^{v'}$ using histograms. A histogram is an accurate representation of the distribution of numerical data. It is an estimate of the probability distribution of a continuous variable. FIG. 18 shows a histogram of the distributions of the Euclidean distances between $ED^v$ and $ED^{v'}$. According to FIG. 18, the distribution is much more clustered around 0 when the representations comes from the modified virtual images $ED^{v'}$ (red) compared to the distribution obtained when using the original virtual images $ED^v$ (blue). This histogram validates the tested hypothesis, which assumes that the modified virtual data are transferred a new domain closer to the real world data than the root virtual data in terms of data distribution. In terms of photo-realism, consider the test of asking people to visually guess whether a given image is artificial or real. It seems evident that the modified images are more likely to foolish humans visually than the original virtual ones. This is directly linked to the distribution alignment assessed by the above histogram.

The second approach is the Frechet Inception distance (FID) approach (see [21]). FID compares the distributions of Inception embeddings (activations from the penultimate layer of the Inception, see [22]) of two set of Images. Both these distributions are modeled as multi-dimensional Gaussians parametrized by their respective mean and covariance. Formally, let $D^A=\{(x_A)\}$ be a first dataset of scenes (e.g. a dataset of real scenes) and let $D^B=\{(x_B)\}$ be a second dataset (e.g. of virtual scenes). The second approach first extracts deep features, $v^A$'s and $v^B$'s, in from $x_A$'s and $x_B$'s respectively, using a feature extractor network derived from a pre-trained network, e.g. trained on the ImageNet classification task, (the inception network, see [22]). Next, the second approach gathers the features in $v^A$'s. This yields a number of C-dimensional vectors, where C is the feature dimension. The second approach then fits a multi-variate Gaussian to these features vectors by computing the mean $\mu_L^A$ and the co-variance matrix $\Sigma_L^A$ of these vectors. Similar, we have $\mu_L^B$ and $\Sigma_L^B$. The FID between these extracted features is:

$$\|\mu_L^A - \mu_L^B\|^2 + Tr(\Sigma_L^A + \Sigma_L^B) - 2\sqrt{\Sigma_L^A \Sigma_L^B}.$$

The smaller the distance is, the closer the distributions of $D^A$ and $D^B$ are. From a photo-realism point of view, in the case the first dataset is a dataset of real scenes and the second dataset is a dataset of virtual scenes, the smaller the distance is, the more photo-realistic images from $D^B$ are. This measurement permits to assess the relevance of modifying our data from one domain to another in terms of distribution alignment.

It follows from the previous discussion on data distributions that the distance between two datasets of scenes may be quantified by a distance, such as the previously discussed Euclidean distance or FID. Thus, in the context of the present disclosure, by "a first dataset (e.g. a family, e.g. a domain), the concept of domain being discussed hereinbelow) of scenes is closer to a second dataset (e.g. a family, e.g. a domain) of scenes than a third dataset (e.g. a family, e.g. a domain) of scenes", it is meant the following: the distance between the first dataset (resp. family or domain) and the second dataset (resp. family or domain) is lower than the distance between the third dataset (resp. family or domain) and the second dataset (resp. family or domain). In the case the second dataset is a dataset of real scenes, and both the third and first dataset are datasets of virtual scenes, the first dataset may be said to be more photo-realistic than the third dataset.

The concept of "domain" is now discussed. A domain designates distribution of a family of scenes. As such, a domain is as well a family of distributions. A dataset of scenes belongs to a domain if the scenes of the dataset and the scenes of the family are close in terms of data distribution. In examples, it means that there exists a predetermined threshold such that, the distance (e.g. Euclidean or FID as previously discussed) between the scenes of the dataset and the scenes of the family is lower than the predetermined threshold. It is to be understood that a dataset of scenes may also form a domain as such, in which case the domain may be referred to as a "domain of scenes" or as a "domain made of the scenes of the dataset". The first domain according to the domain-adaptive learning method is a domain of virtual scenes, e.g. a domain of virtual scenes which are each geometrically and semantically realistic but not photo-realistic. The second domain according to the domain-adaptive learning method is a domain of real scenes. The test domain according to the domain-adaptive learning method may be a domain of real scenes. Alternatively, the test domain may be a domain of virtual scenes, for example geometrically and semantically realistic and optionally photo-realistic. The training domain according to the domain-adaptive learning method may be a domain of virtual scenes, for example geometrically and semantically realistic and optionally photo-realistic. In examples, the training domain is a domain of virtual scenes which are less photo-realistic than the scenes of the test domain, for example the training domain is a domain of virtual scenes while the test domain is a domain of real scenes.

The concept of providing a dataset of scenes is now discussed.

In the context of the present disclosure, providing a dataset of scenes may be carried out automatically or by a user. For instance, the user may retrieve the dataset from a memory where the dataset is stored. The user may further choose to complete the dataset by adding (e.g. one by one) one or more scenes to the already retrieved dataset. Adding one or more scenes may comprise retrieving them from one or more memories and including them in the dataset. Alternatively, the user may create at least a part of (e.g. all) the scenes of the dataset. For example, when providing a dataset of virtual scenes, the user may first obtain at least a part of (e.g. all) the scenes by using a 3D simulation software and/or a 3D modelling software and/or a CAD software, as previously discussed. More generally, providing a dataset of virtual scenes, in the context of the domain-adaptive learning method, the domain-adaptive inferring method and/or the process, may be preceded by a step of obtaining (e.g. computing) the scenes, for example by using a 3D simulation software (e.g. for manufacturing environment) and/or a 3D modelling software and/or a CAD software, as previously discussed. Analogously, providing a dataset of real scenes, in the context of the domain-adaptive learning method, the domain-adaptive inferring method and/or the process, may be preceded by a step of obtaining (e.g. acquiring) the scenes, for example through a, as previously discussed, a digital image acquisition process, as previously discussed.

In examples of the domain-adaptive learning method and/or of the process, each virtual scene of the dataset of virtual scenes is a virtual manufacturing scene comprising one or more spatially reconfigurable manufacturing tools. In these examples, the domain-adaptive neural network is configured for inference of spatially reconfigurable manufacturing tools in a real manufacturing scene. In these examples, the virtual scenes of the dataset of virtual scenes may each stem from a simulation. The providing S10 of the dataset of virtual scenes may thus be preceded by a step of carrying out simulations, e.g. using a 3D simulation software for manufacturing environment, as previously discussed. In examples, the simulations may be 3D Experiences (i.e. virtual scenes with exact modelling and with faithful (e.g. compliant, e.g. conforming to reality) behaviours), where different configurations of given scenes, e.g. different arrangements of objects in a given scene and/or different configurations of some (e.g. spatially reconfigurable) objects in a given scene, are simulated. The dataset may notably comprise virtual scenes corresponding to said different configurations.

In examples of the domain-adaptive learning method and/or of the process, each real scene of the test dataset is a real manufacturing scene comprising one or more spatially reconfigurable manufacturing tools. In these examples, the domain-adaptive neural network is configured for inference of spatially reconfigurable manufacturing tools in a real manufacturing scene. In these examples, the real scenes of the test dataset may each stem from images acquired in a digital acquisition process. The providing S10 of the test dataset of virtual scenes may thus be preceded by a step of acquiring images of a plant from which the scenes of the test dataset stem from, e.g. by using one or more scans and/or one or more cameras and/or one or more video-cameras.

In examples of the domain-adaptive inferring method and/or of the process, the test dataset comprises real scenes. In these examples, each real scene of the test dataset may be a real manufacturing scene comprising one or more spatially reconfigurable manufacturing tools, the domain-adaptive neural network being optionally configured for inference of spatially reconfigurable manufacturing tools in a real manufacturing scene. The providing S10 of the test dataset of virtual scenes may thus be preceded by a step of acquiring images of a plant from which the scenes of the test dataset stem from, e.g. by using one or more scans and/or one or more cameras and/or one or more video-cameras.

The determining S20 of the third domain is now discussed.

The determining S20 of the third domain is such that the third domain is closer to the second domain than the first domain in terms of data distributions. As such, the determining S20 of the third domain designates, for each virtual scene of the dataset of virtual scenes belonging to the first domain, the inference of another scene, such that all the inferred another scenes form (or at least belong to) a domain, namely the third domain, which is closer to the second domain than the first domain in terms of data distributions. The inference of said another scene may comprise the transformation (e.g. the translation) of the virtual scene into said another scene. The transformation may consist in transforming the virtual scene into said another scene, for example using a generator able to transfer an image from one domain to another. It is to be understood that such a transforming may only concern one or more parts of the virtual scene: said one or more parts are transformed, e.g. using the generator, while the rest of the scene is left unchanged. Said another scene may consist the scene of which the one or more parts are transformed with the rest of the scene being unchanged. Alternatively, the transformation may comprise replacing the rest of the scene by a part of some other scene (e.g. belonging to the second domain). In such cases, said another scene may consist in the scene of which the one or more parts are transformed with the rest of the scene being replaced by said part of some other scene. It is to be understood that the inference may be carried out similarly for all scenes of the first domain, e.g. with the same paradigm for all scenes.

Examples of the determining S20 of the third domain are now discussed with reference to FIG. 2, which shows a flowchart illustrating examples of the determining S20 of the third domain.

In examples, the determining S20 of the third domain comprises, for each scene of the dataset of virtual scenes, extracting S200 one or more spatially reconfigurable objects from the scene. In these examples, the determining S20 further comprises, for each extracted object, transforming S210 the extracted object into an object closer to the second domain than the extracted object in terms of data distributions.

As previously discussed, the virtual scenes of the dataset of virtual scenes may be obtained, previous to the providing S10 of the dataset of virtual scenes, by computing, e.g. using a 3D simulation software, virtual simulations from which the scene stem. The computing of the simulation may comprise the automatic localization and annotation of each spatially reconfigurable object in each virtual scene. For each virtual scene of the dataset, and for each spatially reconfigurable object in the virtual scene, the localization may comprise the computing of a bounding box around the spatially reconfigurable object. A bounding box is a rectangular box of which axes are parallel to the sides of the image representing the scene. The bounding box is characterized by four coordinates and is centered on the spatially reconfigurable object with appropriate ratio and scale, so as to encompass the whole spatially reconfigurable object. In the context of the present disclosure, encompassing an object in a scene may mean encompassing all the part of the object which is entirely visible on the scene, said part being the whole object or only a part of it. The annotation may comprise assigning to each computed bounding box, a label indicating that the bounding box encompasses a spatially reconfigurable object. It is to be understood that the label may indicate further information on the bounding box, for instance that the bounding box encompasses a spatially reconfigurable manufacturing tool such as an industrial robot.

For each respective one of the one or more spatially reconfigurable objects, extracting S200 the spatially reconfigurable object from the virtual scene may designate any action resulting in separating the spatially reconfigurable object from the virtual scene and may be carried out by any method able to perform such a separating. The extracting S200 of the spatially reconfigurable object may from the virtual scene may in fact comprise detecting a bounding box encompassing the spatially reconfigurable object, the detecting being based on the label of the bounding box and optionally comprising accessing the label. The extracting S200 may further comprise separating the bounding box from the virtual scene, thereby also separating the spatially reconfigurable object from the virtual scene.

The transforming S210 of the extracted object may designate any transformation which changes the extracted object into another object closer to the second domain in terms of data distributions. By "closer to the second domain", it is meant that the object into the extracted object is transformed into is itself a scene which belongs to a domain closer to the second domain than the first domain. When the extracting S200 of the object comprises separating the bounding box encompassing the object from the virtual scene as previously described, the transforming S210 of the extracted object may comprise the modification of the whole bounding box (thus including the extracted object) or of the extracted object only, wherein the modification of the whole bounding box or of the extracted object only brings it closer to the second domain in terms of data distributions. The modification may comprise applying to the bounding box or to the spatially reconfigurable object with the bounding box a generator able to transform a virtual image into an image which is more photo-realistic in terms of data distributions.

In an implementation, the transforming S210 may be carried out by a CycleGAN Virtual-to-Real network (see [20]) trained on two sets of spatially reconfigurable objects: virtual set and real set. It results in a virtual-to-real spatially reconfigurable object (e.g. robot) generator that is used to modify the spatially reconfigurable objects (e.g. robots) in virtual images. A CycleGAN model translates an image from one domain to another. It proposes a method that can learn to capture special characteristics of one image set and to figure out how to translate these characteristics into a second image collection, all in the absence of any paired training examples. This relaxation of having one-to-one mapping makes in fact this formulation quite powerful. This is achieved by a generative model, specifically a Generative Adversarial Network (GAN) dubbed CycleGAN.

Figure 19:
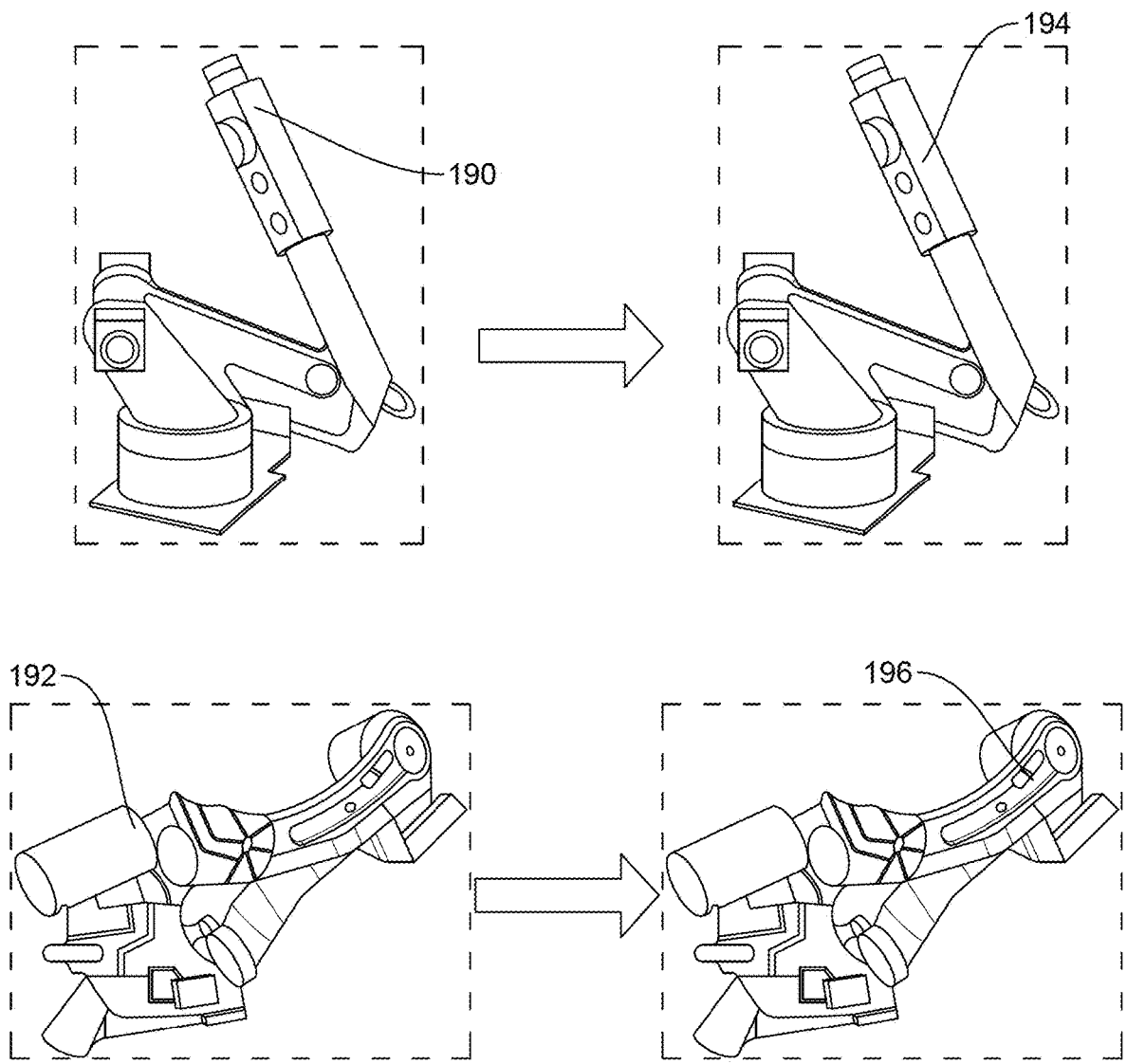

FIG. 19 illustrate an example of the extracting S200 and the transforming S210 of two virtual industrial articulated robots 190 and 192. Each one of these robots 190 and 192 have been extracted S200 from a respective virtual scene. The extracted robots 190 and 192 are then transformed S210 into the more photo-realistic robots 194 and 196, respectively.

Figure 2:
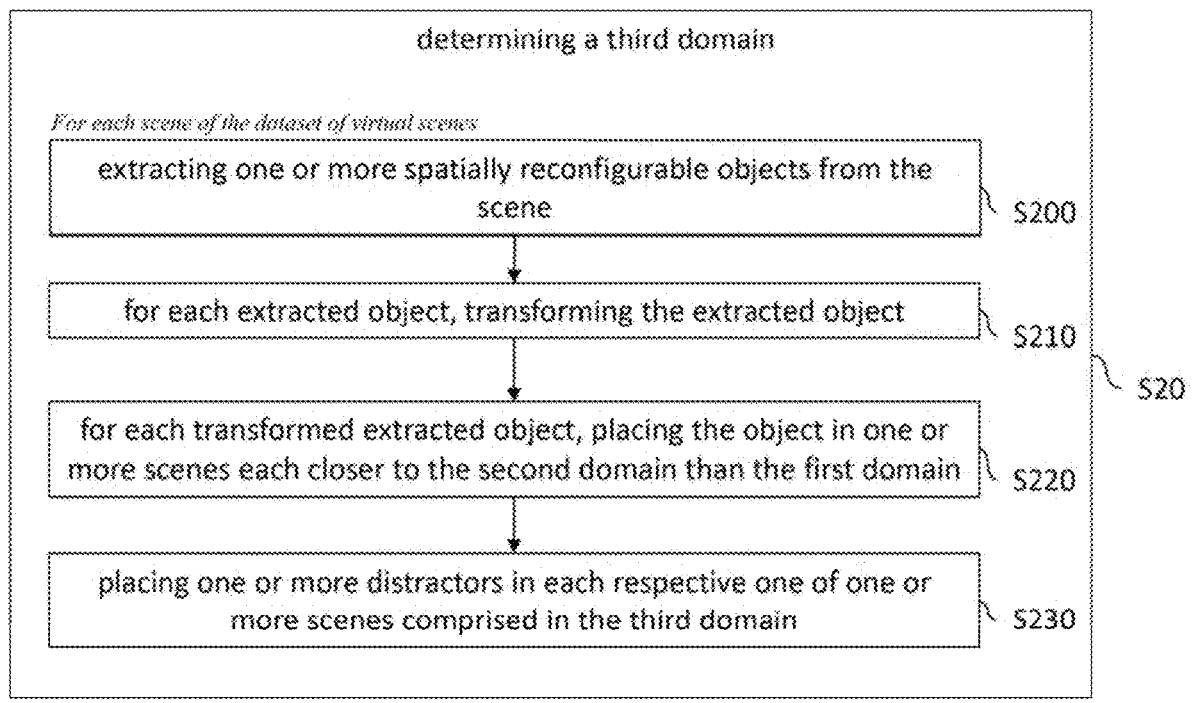
FIGS. 2, 3 and 4 show flowcharts illustrating examples of the computer-implemented process and/or examples of the method.

Still referring to the flowchart of FIG. 2, the determining of the third domain may further comprise, for each transformed extracted object, placing S220 the transformed extracted object in one or more scenes each closer to the second domain than the first domain in terms of data distribution. In such cases, the third domain comprises each scene on which the transformed extracted object is placed.

Each scene of the one or more scenes may be a scene comprising no spatially reconfigurable object, for example a background scene (i.e. a scene comprising a sole background, although the background may itself comprise background objects). Each scene of the one or more scenes may also be a scene from the same context than the scene to which the transformed extracted object originally belongs. This same context may in fact be the context of all the scenes of the dataset of virtual scenes.

Each scene of the one or more scenes is closer to the second domain than the first domain. By "is closer to the second domain", it is meant that each scene of the one or more scenes belongs to a domain which is closer to the second domain than the first domain. In examples, each scene of the one or more scenes is a real scene directly acquired from the reality as previously discussed. Alternatively, each scene of the one or more scenes may be generated from a respective virtual scene of the dataset of virtual scenes, one of said respective virtual scene being for example the virtual scene to which the transformed extracted object belonged, in such a way that the generated scene is real and/or more photo-realistic than the respective virtual scene. Generating a scene from a respective virtual scene of the dataset may comprise applying to the virtual scene a generator able to transform a virtual image into an image which is real and/or more photo-realistic. In an implementation, the generating of the scene may be carried out by a CycleGAN Virtual-to-Real generator (see [20]) trained on two sets of background (e.g. plant background): virtual set and real set. It results in a virtual-to-real background (e.g. plant background) generator that is used to modify the background (e.g. plant backgrounds) in virtual images, A CycleGAN model (see [20]) translates an image from one domain to another. It proposes a method that can learn to capture special characteristics of one image set and to figure out how to translate these characteristics into a second image collection, all in the absence of any paired training examples. This relaxation of having one-to-one mapping makes in fact this formulation quite powerful. This is achieved by a generative model, specifically a Generative Adversarial Network (GAN) dubbed CycleGAN.

The placing S220 of the transformed extracted object may be carried out (e.g. automatically) by any method able to paste single and/or multiple images of objects in images of background. The placing S220 of the transformed extracted object said one or more scenes may thus comprise applying such a method to paste the transformed extracted object on each respective one of the one or more scenes. It is to be understood that the scene on which the transformed extracted object may comprise one or more other transformed extracted objects which have already been placed S220 on the scene.

It follows from the above-discussed examples that, in these examples, the determining S20 of the third domain may notably transform separately the spatially reconfigurable objects of the scenes and the backgrounds of the scenes to which they belong and may then place each transformed spatially reconfigurable object into one or more of the transformed backgrounds. First, this allows to obtain more configurations of transformed objects in transformed backgrounds than transforming entirely (i.e. without separating the spatially reconfigurable objects and their backgrounds) a virtual scene of the dataset of virtual scenes. Since the learning S30 of the domain-adaptive neural network is based on the scenes of the third domain, the learning is more robust because the third domain is closer to the test domain. Second, transforming entirely the virtual scenes of the dataset of virtual scenes could lead to insufficient results, because there could be no underlying relationship between the scenes of the test domain due to real background variability. For example, transforming entirely a virtual scene comprising a spatially reconfigurable object could lead to a transformed scene where the spatially reconfigurable object could not be distinguished from (e.g. mixed with) the background. For all these reasons, transforming entirely the virtual scenes of the dataset of virtual scenes could lead to insufficient results, e.g. by yielding a third domain which could be not closer to the second domain than the first domain. Moreover, scenes of the third domain could in this case be not suited for the learning because characteristics of the objects of interest in these scenes (spatially reconfigurable objects) could be affected by the transforming.

Figure 20:
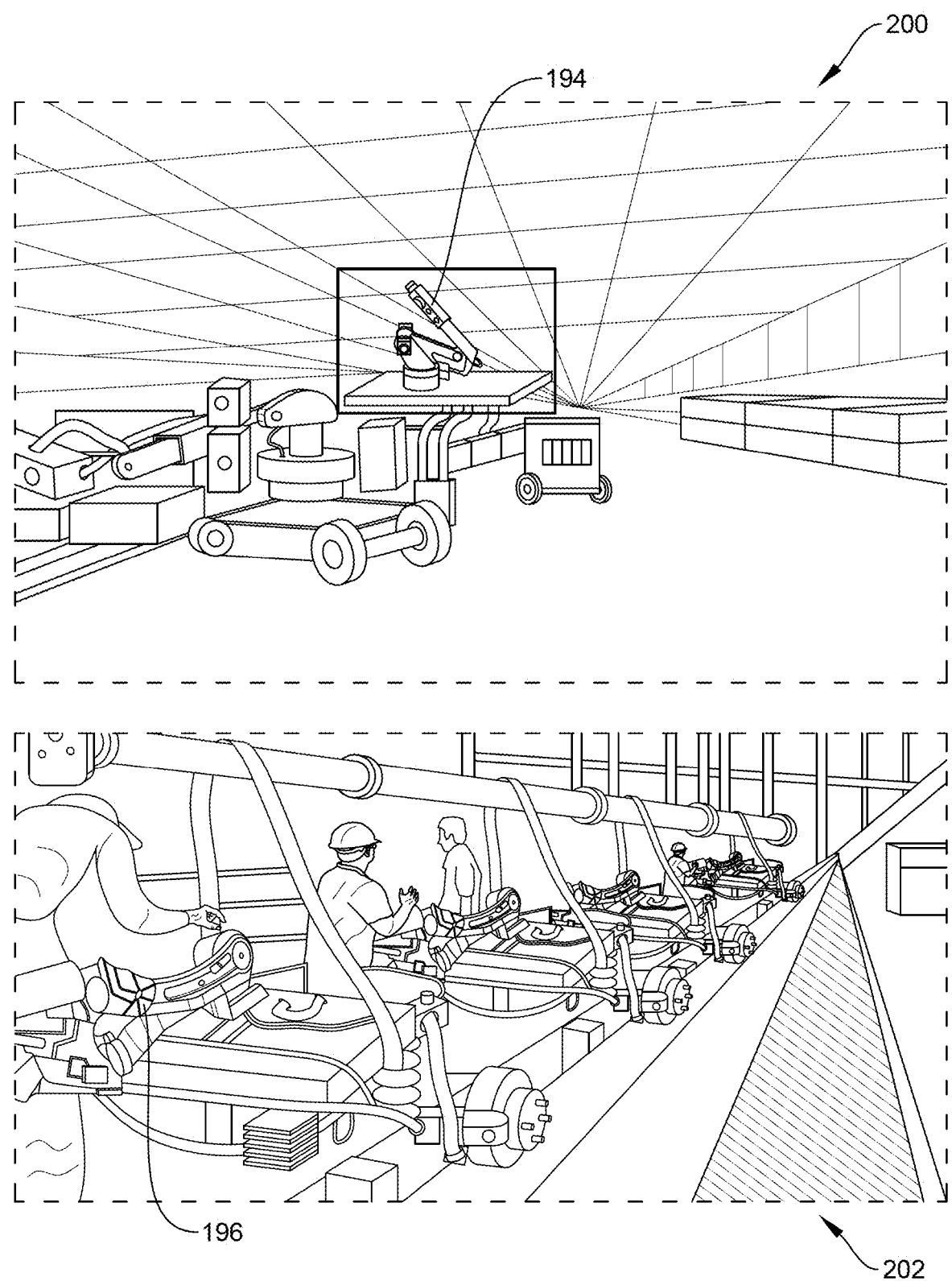

FIG. 20 illustrates an example of the placing S220 of the transformed extracted objects. FIG. 20 shows the transformed extracted industrial articulated robots 194 and 196 of the example of FIG. 19 placed S220 in the plant background scenes 200 and 202, respectively.

Still referring to the flowchart of FIG. 2, in examples, the placing S220 of the transformed extracted object in the one or more scenes is carried out randomly. Such a random placing S220 of the transformed extracted object may be carried out (e.g. automatically) by any method able to paste randomly single and/or multiple images of objects in images of background. The random placing S220 of the transformed extracted object said one or more scenes may thus comprise applying such a method to paste randomly the transformed extracted object on each respective one of the one or more scene.

Placing S220 the transformed extracted objects randomly improves the robustness of the learning S30 of the domain-adaptive neural network, which Is based on a learning set made of scenes of the third domain. Indeed, placing randomly the transformed extracted objects ensures that the domain-adaptive neural network will not focus on the locations of the transformed extracted objects during the learning S30, because there would be a too large sparse range of such locations for the learning S30 to rely on them and/or to learn correlations between the transformed extracted object and their positions. Instead, the learning S30 may truly focus on the inference of the spatially reconfigurable objects regardless of their locations. Incidentally, not relying on the locations of the spatially reconfigurable objects allows to reduce significantly the risks for the domain-adaptive neural network to miss a spatially reconfigurable object that the domain-adaptive neural network is supposed to infer for the mere reason that the object does not occupy a proper location.

In the above examples, the third domain comprises, for each transformed extracted object, each scene on which the transformed extracted object is placed S220. For example, the third domain is made of such scenes. In other words, for all scenes of the dataset of virtual scenes, the extracting S200, the transforming S210 and the placing S220 are carried out similarly. For example, they are carried out such that all scenes on which one or more transformed extracted objects is placed S220 have substantially the same level of photo-realism. In other words, they belong to and/or form a domain, namely the third domain.

Still referring to the flowchart of FIG. 2, the determining S20 of the third domain may comprise placing S230 one or more distractors in each respective one of one or more scenes comprised in the third domain. A distractor is an object which is not a spatially reconfigurable object.

A distractor may be an object which has substantially the same level of photo-realism than the transformed extracted objects. As a matter of fact, the distractors may be objects of the virtual scenes of the dataset of virtual scenes which are extracted from said virtual scenes, transformed into objects closer to the second domain, and placed in the scenes of the third domain in a similar manner as for the spatially reconfigurable objects of the virtual scenes. Alternatively, the distractors may stem from another dataset of real or virtual distractors, in which case the determining S20 may comprise a step of providing such a dataset. It is to be understood that, in any case, the distractors have a level of photo-realism which is such that they may be placed S230 in the scenes of the third domain and that, after such a placing S230, the scenes still belong to the third domain.

Figure 21:
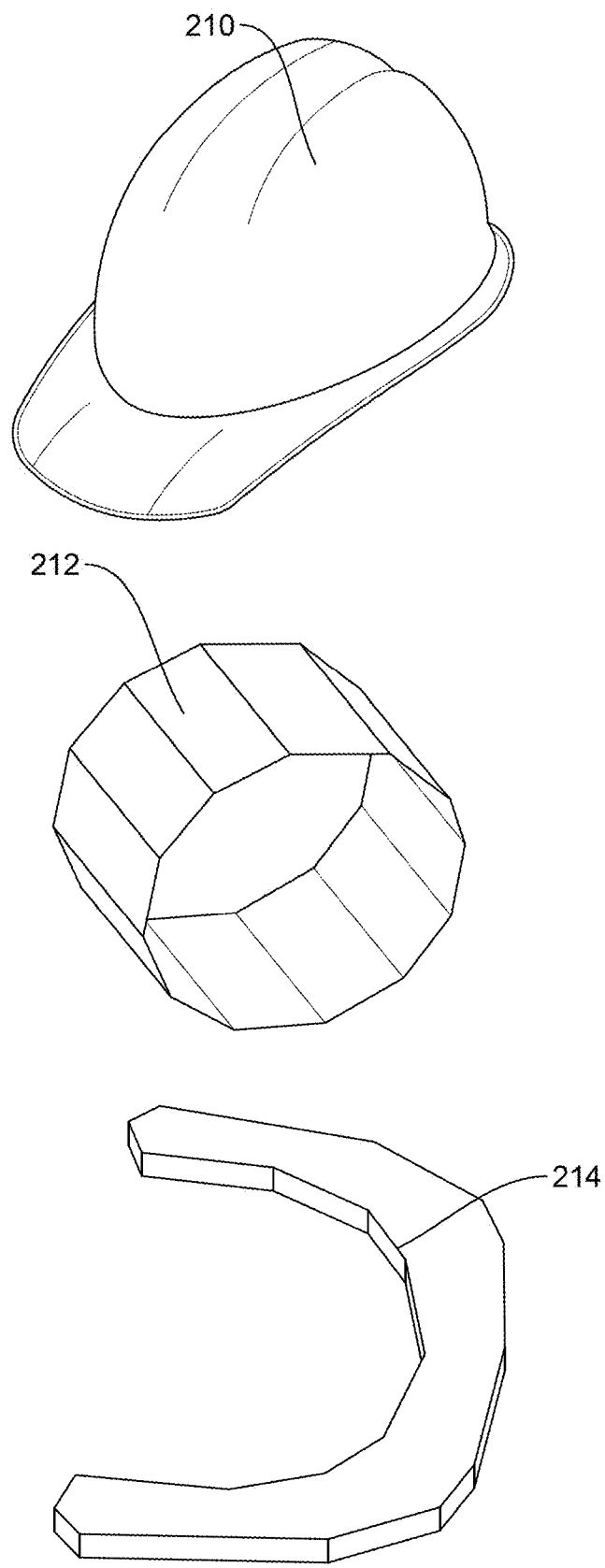

A distractor may be a mechanical part, e.g. extracted and transformed from a virtual manufacturing scene, as previously discussed, or any other object, e.g. that is part of the background of a virtual (e.g. manufacturing) scene. FIG. 21 shows three distractors 210, 212 and 214 to be placed in one or more scenes of the third domain in the context of manufacturing scenes. The distractors 210, 212 and 214 are respectively a hard hat (which is an object of the background of a manufacturing scene), a sheet of metal (which is a mechanical part) and an iron horseshoe-shaped forged part (which is a mechanical part).

Placing S230 distractors, and especially distractors which are obtained similarly to the transformed extracted objects (as previously discussed), allows to reduce the sensibility of the neural network to numerical (e.g. digital, e.g. imaging) artefacts. Indeed, as a result of the extracting S200 and/or the transforming S210 and/or the placing S220, it may be that a scene of the third domain comprising at least one transformed extracted object features one or more numerical artefacts at the location where the at least one transformed extracted object is placed S220. Placing S230 a distractor in the scene may cause the same kind of artefacts to appear at the location where the distractor is placed. Thus, when being learned S30, the domain-adaptive neural network will not focus on the artefacts, or at least, will not link the artefacts with the spatially reconfigurable object, precisely because artefacts are caused by the distractors as well. This makes the learning S30 more robust.

Referring back to the flowchart of FIG. 1, the learning S30 of the domain-adaptive neural network is now discussed.

The general concepts of "machine-learning" and "learning a neural network" are first briefly discussed.

As known from the field of machine-learning, the processing of an input by a neural network includes applying operations to the input, the operations being defined by data including weight values. The learning of the neural network thus includes determining values of the weights based on a dataset configured for such learning, such a dataset being possibly referred to as a learning dataset or a training dataset. For that, the dataset includes data pieces each forming a respective training sample. The training samples represent the diversity of the situations where the neural network is to be used after being learnt. Any dataset referred herein may comprise a number of training samples higher than 1000, 10000, 100000, or 1000000. In the context of the present disclosure, by "learning a neural network based on a dataset", it is meant that the dataset is a learning/training set of the neural network. By "learning a neural network based on a domain", it is meant that the training set of the neural network is a dataset that belongs to and/or forms the domain.

Any neural network of the present disclosure, such as the domain-adaptive neural network, or such as the detector, the teacher extractor or the student extractor, which will be all discussed later, may be a deep neural network (DNN), learned by any deep learning technique. Deep learning techniques are a powerful set of techniques for learning in Neural Networks (see [19]) which is a biologically-inspired programming paradigm enabling a computer to learn from observational data. In image recognition, the success of DNNs is attributed to their ability to learn rich midlevel media representations as opposed to hand-designed low-level features (Zernike moments, HOG, Bag-of-Words, SIFT) used in other image categorization methods (SVM, Boosting, Random Forest). More specifically, DNNs are focused on end-to-end learning based on raw data. In other words, they move away from feature engineering to a maximal extent possible, by accomplishing an end-to-end optimization starting with raw features and ending in labels.

The concept of "being configured for inference of a spatially reconfigurable objects in a scene" is now discussed. The discussion applies in particular to the domain-adaptive neural network according to any one of the domain-adaptive learning method, the domain-adaptive inferring method or the process, independently from the manner with which the domain-adaptive neural network is learned. Inferring spatially reconfigurable objects in a scene means inferring one or several spatially reconfigurable objects in a scene that contains one or more of such objects. It may mean inferring all the spatially reconfigurable objects in the scene. As such, a neural network configured for inference of spatially reconfigurable objects in a scene takes as input the scene and output data pertaining to the locations of one or more of the spatially reconfigurable objects. For example, the neural network may output a (e.g. digital) image representation of the scene where respective bounding boxes encompass each a respective one of the inferred spatially reconfigurable objects. The inference may also comprise the computing of such bounding boxes and/or the labelling of the bounding boxes (e.g. as encompassing a spatially reconfigurable object of the scene) and/or the labelling of the inferred spatially reconfigurable objects (as a spatially reconfigurable object). The output of the neural network may be stored in a database and/or displayed on a screen of a computer.

The learning S30 of the domain-adaptive neural network may be carried out by any machine-learning algorithm capable of learning a neural network configured for inference of spatially reconfigurable objects in a real scene.

The learning S30 of the domain-adaptive neural network is based on the third domain. Thus, the third domain is, or at least contains, the training/learning set of the domain-adaptive neural network. It appears clearly from the previous discussion on the determining S20 of the third domain that the training/learning set of the domain-adaptive neural network stems (e.g. is obtained) from the provided S10 dataset of virtual scenes. In other words, the determining S20 may be thought of as a pre-processing of the theoretical training/ learning set, which is the dataset of virtual scene, so as to transform it into a practical training/learning set, namely scenes of the third domain, closer to the set on which the neural-network, once learned, will take its inputs. This improves the robustness of the learning S30 and the output quality of the domain-adaptive neural network, as previously discussed.

The domain-adaptive neural network may comprise (e.g. may consist in) a detector, also referred to as an object detector, which forms at least a part of the domain-adaptive neural network. The detector is thus itself a neural network, which is further configured for detecting spatially reconfigurable objects in a real scene. The detector may typically comprise millions of parameters and/or weights. The learning S30 of the domain-adaptive method may comprise a training of the detector which sets the values of these parameters and/or weights. Such a training may typically comprise updating these values, which consists in successively correcting these values according to the output of the detector for each input taken by the detector. During training, an input of the detector is a scene, and an output comprises (at least after appropriate training) data pertaining to the locations of one or more (e.g. all) spatially reconfigurable objects in this scene (e.g. bounding box and/or annotations, as previously discussed).

The correcting of the values may be based on annotations associated with each input. An annotation is a set of data associated with a specific input which allows evaluating if the output of the model is true or false. For example, and as previously discussed, each spatially reconfigurable object of a scene belonging to the third domain may be encompassed by a bounding box. As previously said, in the context of the present disclosure, encompassing an object in a scene may mean encompassing all the part of the object which is entirely visible on the scene. The bounding box may be annotated so as to indicate that it encompasses a spatially reconfigurable object. The correcting of the values may thus comprise assessing such annotations of a bounding box of a third domain scene inputted to the detector, and based on the assessed annotations, determining whether the spatially reconfigurable object encompassed in the bounding box is indeed outputted by the detector. Determining whether the output of the detector comprises the spatially reconfigurable object encompassed in the bounding box may comprise assessing a correspondence between the output of the detector and the spatially reconfigurable object, for instance by evaluating if the output is true (e.g. if it comprises the spatially reconfigurable object) or false (e.g. if it does not comprise the spatially reconfigurable object).

The above-described way of training the detector by using annotations of the virtual dataset may be referred to as "supervised learning". The training of the detector may be carried out by any supervised learning method. Once the detector is trained, the correcting of the values stops. At this point, the detector is able to process a new input (i.e. an unseen input during the training of the detector) and return detection results. In the context of the present disclosure, the new input of the detector is a scene of the test domain. Once trained, the detector returns two different outputs as the task of "detection" means performing jointly a task of recognition (or classification) and a task of localization of spatially reconfigurable objects in a real scene of the test dataset.

The task of localization comprises computing bounding boxes each encompassing a spatially reconfigurable object of the real scene inputted to the detector. As previously said, a bounding box is a rectangular box which axes are parallel to the image sides, and it is characterized by four coordinates. In examples, the detector returns for each spatially reconfigurable object of the scene inputted to the detector a bounding box centered on the object with appropriate ratio and scale.

The task of classification comprises labelling each computed bounding box with a respective label (or annotation) and associating to the label a confidence score. The confidence score reflects the confidence of the detector that the bounding box truly encompasses a spatially reconfigurable object of the scene provided as input. The confidence score may be a real number between 0 and 1. In such cases, the closer the confidence score is to 1, the more confident the detector is for the label associated with the corresponding bounding box to truly annotate a spatially reconfigurable object.

Examples of the learning S30 of the domain-adaptive neural network are now discussed with reference to FIG. 3, which shows a flowchart illustrating examples of the learning S30 of the domain-adaptive neural network.

Figure 3:
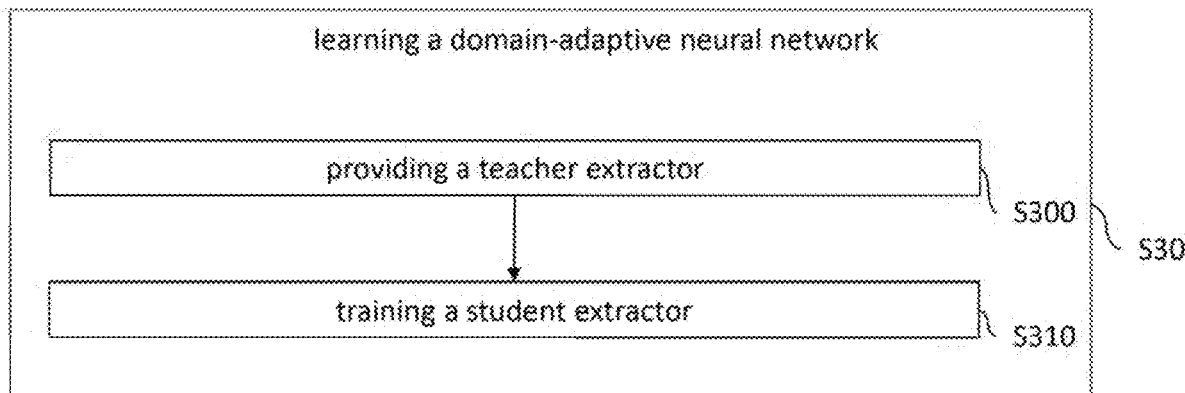

Referring to the flowchart of FIG. 3, the learning S30 of the domain-adaptive neural network may comprise providing S300 a teacher extractor. The teacher extractor is a machine-learned neural network configured for outputting image representations of real scenes. In such cases, the learning S30 of the domain-adaptive neural network further comprises training S310 a student extractor. The student extractor is a neural network configured for outputting image representations of scenes belonging to the third domain. The training S310 of the student extractor comprises minimizing a loss. For each scene of one or more real scenes, the loss penalizes a disparity between a result of applying the teacher extractor to the scene and a result of applying the student extractor to the scene.

The student extractor is a neural network configured for outputting image representations of scenes belonging to the third domain. The student extractor may be a part of the detector, and as such, the student extractor may be further configured to output said image representations of scenes belonging to the third domain to other parts of the detector. At least one of such other parts may be configured for the task of localization and at least one of such other parts may be configured for the task of classification, as previously discussed. The student extractor may thus output image representations of scenes of the third domain to said other parts so that said other parts may carried out the tasks of localization and classification. Alternatively, the student extractor may be a part of the domain-adaptive neural network and may in this case output image representation to other parts of the domain-adaptive neural network (such as the detector).

This amounts to say that the student extractor oversees outputting image representations of scenes belonging to the third domain while at least one other part of the domain-adaptive neural network (e.g. the previously discussed detector) oversees detecting (e.g. localizing and classifying) spatially reconfigurable objects in each scene of the third domain. Said detecting may be based on said image representations outputted by the student extractor. In other words, image representations outputted by the student extractor are fed to remaining parts of the domain-adaptive neural networks, e.g. remaining parts of the detector in case the student extractor forms a part of the detector.

The student extractor is trained with the help of the provided S300 teacher extractor. The teacher extractor is a machine-learned neural network configured for outputting image representations of real scenes. In examples, this means that the teacher extractor has been learned on real scenes to output image representations the real scenes, for example by learning robust convolutional filters for real data style. Layers of neurons of the teacher extractor typically encode the representation of a real image to be outputted. The teacher extractor may have been learned on any dataset of real scenes, e.g. available from open source, and by any machine-learning technique. Providing S300 the teacher extractor may comprise accessing a database where the teacher extractor has been stored after its leaning and retrieving the teacher extractor from the database. It is to be understood that teacher extractor may be already available, i.e. the domain-adaptive learning method may not comprise the learning of the teacher extractor by only the providing S300 of the already available teacher extractor. Alternatively, the domain-adaptive learning method may comprise, before the providing S300 of the teacher extractor, the learning of the teacher extractor, by any machine-learning technique.

Still referring to the flowchart of FIG. 2, the training S320 of the student extractor is now discussed.

Said training S320 comprises minimizing a loss which, for each scene of one or more real scenes, penalizes a disparity between a result of applying the teacher extractor to the scene and a result of applying the student extractor to the scene. At least a part of (e.g. all of) the one or more real scenes may be scenes of the test dataset and/or at least a part of (e.g. all of) the one or more real scenes may be scenes of another dataset of real scenes belonging to the second domain, e.g. that are not annotated and not necessarily numerous. The minimizing of the loss involves the results of applying both the teacher extractor and the student extractor to each respective one of the one or more real scenes, which means that said real scenes are fed to both the teacher extractor and the student extractor during the training S310 of the latter. Thus, while at least a part of the domain-adaptive neural network is trained on virtual data belonging to the third domain, such as the previously discussed detector, at least a part of the domain-adaptive neural network, namely the student extractor is trained on real data.

The loss may be a quantity (e.g. a function) which, for each real scene of the one or more real scenes, measures a similarity and/or a dissimilarity between the result of applying the teacher extractor to the scene and the result of applying the student extractor to the scene. The loss may for example be a function which takes as parameters each scene of the one or more real scenes, which takes as inputs the result of applying the teacher extractor to the scene and the result of applying the student extractor to the scene and which outputs a quantity (such as a positive real number) expressing similarities and/or dissimilarities between the result of applying the teacher extractor to the scene and the result of applying the student extractor to the scene. For each scene of the one or more real scene, the disparity between the result of applying the teacher extractor to the scene and the result of applying the student extractor to the scene may be a quantification of a dissimilarity between the result of applying the teacher extractor to the scene and the result of applying the student extractor to the scene. Penalizing the disparity may mean that the loss is an increasing function of the disparity.

The minimizing of the loss, by penalizing disparities between outputs of the teacher extractor and the student extractor, improves the robustness of the learning S30 of the domain-adaptive neural network. Notably, the teacher extractor, which is already learned and thus of which weights and/or parameters are not modified during the training S320 of the student extractor, guides the student extractor. Indeed, since disparities between outputs of the student extractor and the teacher extractors are penalized, parameters and/or weights of the student extractor are modified so that the student extractor learns to output real image representations which are close to those outputted by the teacher extractor in terms of data distributions. Put it in another way, the student extractor is trained to imitate the teacher extractor in the manner of outputting real image representations. The student extractor may thus learn the same or substantially the same robust convolutional filters for real data style than the one learned by the teacher extractor during its training. As a result, the student extractor outputs real image representations of scenes originally belonging to the third domain, even though these scenes may be relatively far from the second domain (made of real scenes) in terms of data distribution. This allows to make the domain-adaptive neural network, or, where appropriate, its detector, invariant to data appearance, because the way the student extractor is trained S320 makes the domain-adaptive neural network able to infer spatially reconfigurable objects from real scenes while being trained on annotated virtual scenes of the third domain.

The loss may be referred to as a "distillation loss", and the training S320 of the student extractor using the teacher extractor may be referred to as a "distillation approach". The minimizing of the distillation loss may be carried out by any minimizing algorithm or any relaxation algorithm. The distillation loss may be part of a loss of the domain-adaptive neural network, optionally also comprising a loss of the previously-discussed detector. In an implementation, the learning S30 of the domain-adaptive neural network may comprise the minimizing of the loss of the domain-adaptive neural network which may be of the type:

$$L_{training} = L_{detector} + L_{distillation},$$

where $L_{training}$ is a loss corresponding to the learning S30 of the domain-adaptive neural network $L_{detector}$ is a loss corresponding to the training of the detector, and $L_{distillation}$ is the distillation loss. Minimizing the loss of the domain-adaptive neural network $L_{training}$ may thus comprise minimizing, by any relaxation algorithm, the loss of the detector $L_{detector}$ and the distillation loss $L_{distillation}$, simultaneously or independently.

In examples, the result of applying the teacher extractor to the scene is a first Gram matrix and the result of applying the student extractor to the scene is a second Gram matrix. The Gram matrix of an extractor (e.g. the student or the teacher) is a form of representation of the distribution of data on the image outputted by the extractor. More specifically, applying an extractor to a scene yields an image representation and computing the Gram matrix of the image representation yields an embedding of the distribution of the image representation, so called a Gram-based representation of the image. This amounts to say that, in examples, the result of applying the teacher extractor to the scene is a first Gram-based representation of the image representation outputted by the teacher extractor resulting from the computing of a first Gram matrix of the image representation outputted by the teacher extractor, and the result of applying the student extractor to the scene is a second Gram-based representation of the image representation outputted by the student extractor resulting from the computing of a second Gram matrix of the image representation outputted by the student extractor For example, the Gram matrix may contain non-localized information about the image outputted by the extractor, such as texture, shapes and weights.

In examples, the first Gram matrix is computed on several layers of neurons of the teacher extractor. Said layers of neurons comprise at least the last layer of neurons. In these examples, the second Gram matrix is computed on several layers of neurons of the student extractor. Said layers of neurons comprise at least the last layer of neurons.

The last layer of neurons of an extractor (the teacher or the student) encodes the image as outputted by the extractor. Both the first and second Gram matrices are computed on several layers of neurons, that is a deeper layer of neurons. This means that they both comprise more information on the image outputted than the image itself. This makes the training of the student extractor more robust because it increases the level of real-style closeness between the outputs of the teacher and student extractors, which is what the minimizing of the loss aims at. Notably, the student extractor may thereby be able to infer accurately the two layer representations of a real image, just as its teacher.

In examples, the disparity is a Euclidean distance between the result of applying the teacher extractor to the scene and the result of applying the student extractor to the scene.

An implementation of the minimizing of the distillation loss is now discussed. In this implementation, the style representation of an image outputted by an extractor (teacher or student) at some layer of neurons $\ell$ is encoded by the distribution of features of the image in this layer. In this implementation, a Gram matrix is used to encode the feature correlation, which is one form of the feature distribution embedding. Formally, for a layer $\ell$ of response $F^\ell$ with filters of length $N^\ell$, the feature correlations are given by the Gram matrix $G^\ell \in R^{N^\ell \times N^\ell}$, where $G_{i,j}^\ell$ is the inner product between the vectorized feature map i and j in layer $\ell$:

$$G_{i,j}^\ell = \sum_k F_{i,k}^\ell F_{j,k}^\ell$$

The intuition behind the proposed distillation approach is to ensure that, during learning, the student extractor weights are updated so that it outputs data style representation close to the one that the teacher extractor produces on real data. To do so, the learning S30 comprises minimizing the Gram-based distillation loss $L_{distillation}$ at the feature extractor level. Given a real image, let $F^\ell$ and $E^\ell$ be the corresponding feature map outputs at some layer $\ell$ of, respectively, the student extractor and the teacher extractor. Hence, the proposed distillation loss at layer $\ell$ is of the type:

$$L_{distillation}^\ell = \|G_F^\ell - G_E^\ell\|,$$

where $\|G_F^\ell - G_E^\ell\|$ is any distance (e.g. a Euclidean distance) between the corresponding Gram Matrices $G_F^\ell$ and $G_E^\ell$. Consider distilling knowledge from layers $\{\ell_1, \ldots, \ell_m\}$, then the distillation loss is of the type:

$$L_{distillation} = \sum_{1 \le i \le m} L_{distillation}^{\ell_i}.$$

As previously discussed, the learning S30 of the domain-adaptive neural network may then comprise the minimizing of a loss of the type:

$$L_{training} = L_{detector} + L_{distillation}.$$

Referring back to the flowchart of FIG. 1, the determining S50 of the intermediary domain is now discussed.

The determining S50 of the intermediary domain is such that the intermediary domain is closer to the training domain than the test domain in terms of data distributions. As such, the determining S50 of the intermediary domain designates, for each scene of the test dataset of scenes, the inference of another scene, such that all the inferred another scenes form a domain, namely the intermediary domain, which is closer to the training domain than the test domain in terms of data distributions. The inference of said another scene may comprise the transformation (e.g. the translation) of the scene into said another scene. The transformation may consist in transforming the scene into said another scene, for example using a generator able to transfer an image from one domain to another. It is to be understood that such a transforming may only concern one or more parts of the scene: said one or more parts are transformed, e.g. using the generator, while the rest of the scene is left unchanged. Said another scene may consist the scene of which the one or more parts are transformed with the rest of the scene being unchanged. Alternatively, the transformation may comprise replacing the rest of the scene by a part of some other scene (e.g. belonging to the training domain). In such cases, said another scene may consist in the scene of which the one or more parts are transformed with the rest of the scene being replaced by said part of some other scene. It is to be understood that the inference may be carried out similarly for all scenes of the test domain, e.g. with the same paradigm for all scenes.

The domain-adaptive neural network is not learned on the training domain, but on data obtained from the training domain. Such data may be the result of a processing of data of the training domain. For examples, the data obtained from the training domain may be a dataset of scenes which are each obtained by transforming a respective scene of the training domain. This amounts to say that the data obtained from the training domain may form a dataset of scenes belonging to a domain which is the true training/learning domain of the domain-adaptive neural network. Such a domain may be determined exactly as the third domain, that is by carrying similar operations and steps. In any case, the determining S50 of the intermediary domain may be carried out in such a way (e.g. through the transformation of scenes as previously discussed) that the intermediary domain is closer to the domain formed by the data obtained from the training domain than the test domain. In examples, the data obtained from the training domain form another intermediary domain which is closer to the intermediary domain than the training domain in terms of data distributions. Said another intermediary domain may be the previously discussed third domain. In all these examples, the determining S50 of the intermediary domain amounts to a pre-processing of the test dataset so as to bring it closer to the true training/learning set on which the domain-adaptive neural network has been learned. As previously discussed, this improves the output quality of the domain-adaptive neural network.

In examples, the determining S50 of the intermediary domain comprises, for each scene of the test dataset, transforming the scene of the test dataset into another scene closer to the training domain in terms of data distribution.

The transforming of the scene into the another scene may comprise using a generator able to transfer an image from one domain to another. It is to be understood that such a transforming may only concern one or more parts of the scene: said one or more parts are transformed, e.g. using the generator, while the rest of the scene is left unchanged. Said another scene may consist the scene of which the one or more parts are transformed with the rest of the scene being unchanged. Alternatively, the transformation may comprise replacing the rest of the scene by a part of some other scene (e.g. belonging to the training domain). In such cases, said another scene may consist in the scene of which the one or more parts are transformed with the rest of the scene being replaced by said part of some other scene. It is to be understood that the inference may be carried out similarly for all scenes of the test domain, e.g. with the same paradigm for all scenes.

Examples of the determining S50 of the intermediary domain are now discussed with reference to FIG. 4, which shows a flowchart illustrating examples of the determining S50 of the intermediary domain.

Figure 4:
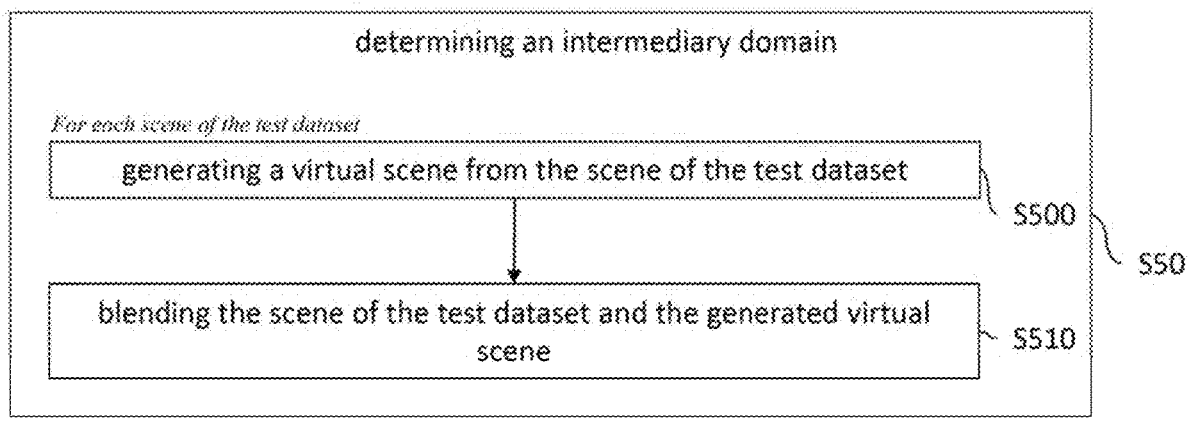

With reference to the flowchart of FIG. 4, the transforming of the scene may comprise generating S500 a virtual scene from the scene of the test dataset. In such cases, the another scene is inferred based on the scene of the test dataset and on the generated virtual scene.

The generating S500 may be carried out by applying any generator able to generate virtual scenes from scenes of the test domain. The another scene may be inferred by mixing the scene of the test dataset and the generated virtual scene and/or by combining (e.g. blending, seamless cloning, or merging e.g. by a merging image channels methods) the scene of the test dataset and the generated virtual scene.

Still referring to the flowchart of FIG. 4, the generating S500 of the virtual scene from the scene of the test dataset may comprise applying a virtual scene generator to the scene of the test dataset. In such cases, the virtual scene generator is a machine-learned neural network configured for inference of virtual scenes from scenes of the test domain.

The virtual scene generator takes as input a scene of the test domain and outputs a virtual scene, e.g. a virtual scene less photo-realistic than the scene of the test domain. It is to be understood that the virtual generator may be already trained/learned. As such, the generating S500 of the virtual scene may comprise providing the virtual scene generator, e.g. by accessing memory where the virtual scene generator has been stored after its training/learning and retrieving the virtual scene generator from the memory. Additionally or alternatively, the providing of the virtual scene generator may be preceded by the learning/training of the virtual scene generator, by any machine-learning technique suitable for such a training.

In examples, the virtual scene generator has been learned on a dataset of scenes each comprising one or more spatially reconfigurable objects. In such examples, the virtual scene generator is able, when fed a scene comprising one or more spatially reconfigurable objects, to output a virtualization of the scene, which is a virtual scene also comprising the one or more spatially reconfigurable objects, e.g. all in the same position and/or configuration. As previously said, it is to be understood that the domain-adaptive inferring method and/or the process may only comprise providing the virtual scene generator (that is, without its learning), or may further comprise the learning of the virtual scene generator.

In an implementation of the domain-adaptive inferring method and/or of the process, where the test dataset is made of real manufacturing scenes comprising manufacturing robots, the generator is CycleGAN Real-to-Virtual network trained on two datasets of manufacturing scenes comprising manufacturing robots: a virtual dataset and real dataset. The method and/or the process comprises, in this implementation, training, on the two datasets, the CycleGAN network to adapt robots' appearance in test images of test scenes in order to be closer to the training set of the domain-adaptive neural network, which in this implementation is the third domain according to the domain-adaptive learning method, and which is made of virtual manufacturing scenes comprising virtual manufacturing robots. The training results in a Real-to-Virtual robot generator that is able to modify the real test images so as to virtualize them.

Figure 22:
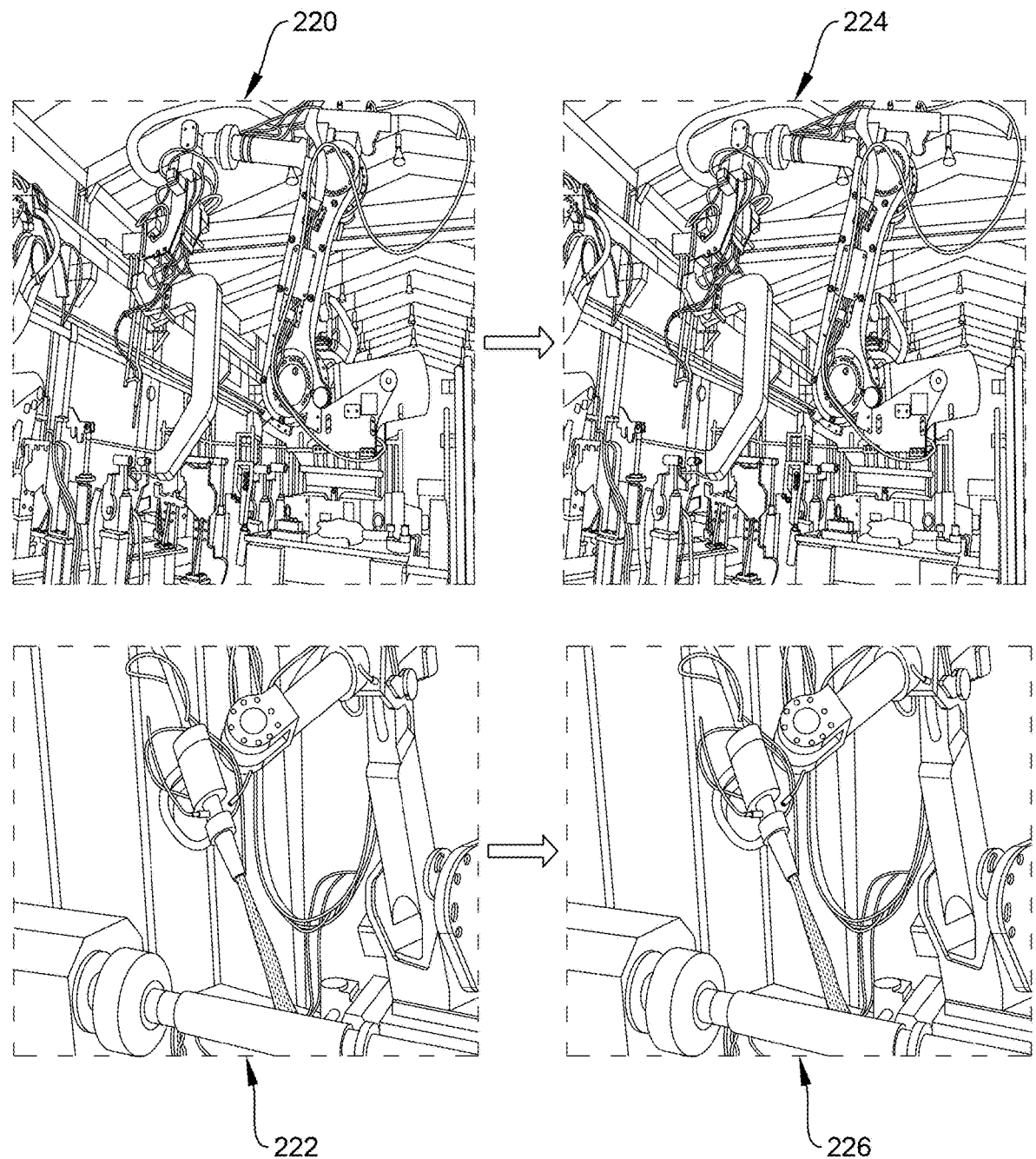

FIG. 22 illustrate an example of the generating S500 using a CycleGAN generator. In this example, the test dataset is made of real manufacturing scenes each comprises one or more manufacturing robots. FIG. 22 shows a first real scene 220 and a second real scene 222 of the test dataset. Both scenes are manufacturing scenes comprising articulated robots. FIG. 22 further shows a first virtual scene 224 and a second virtual scene 226 generated from the first and second scene 220 and 222, respectively, by applying the CycleGAN generator.

Still referring to the flowchart of FIG. 4, the determining S50 of the intermediary domain may comprise blending S510 the scene of the test dataset and U) the generated virtual scene. In such cases, the blending results in the another scene.

Formally, let I be the scene of the test dataset, let I' be the generated virtual scene, and let I" be the another scene. Blending S510 I and I' can refer to any method able to mix I and I', so that the mixing results in I". In examples, the blending S510 of the scene of the test dataset and of the generated virtual scene is a linear blending. In an implementation, the linear blending consists in computing the another scene I" through the following formula:

$$I''=\alpha*I+(1-\alpha)*I'.$$

Figure 23:
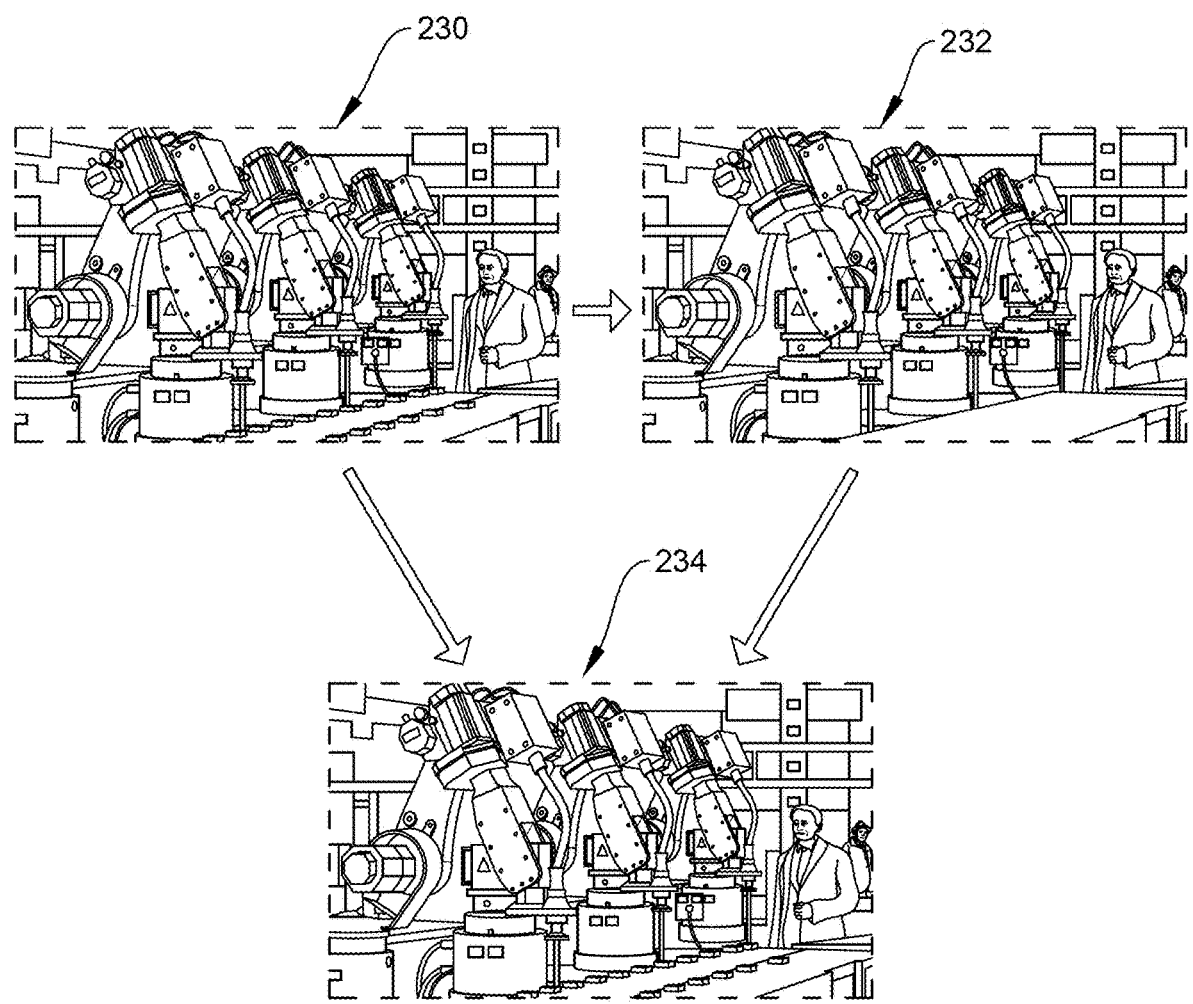
Figure 24:
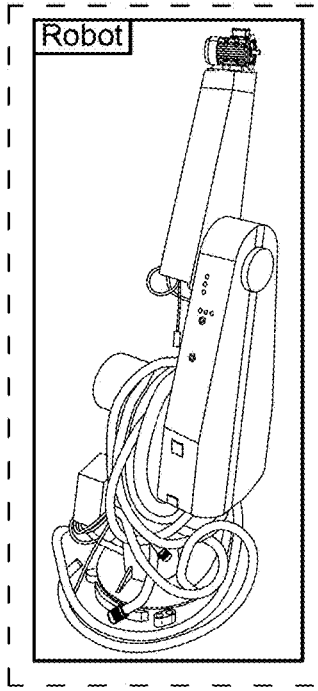
Figure 25:
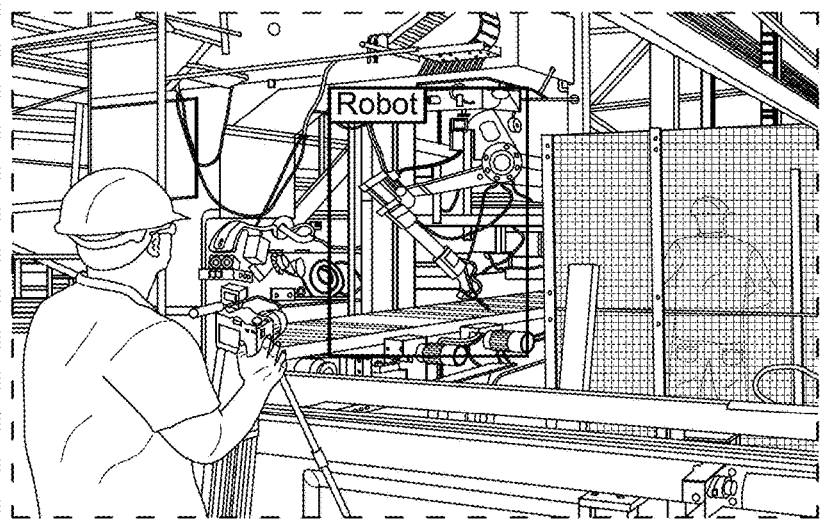
Figure 26:
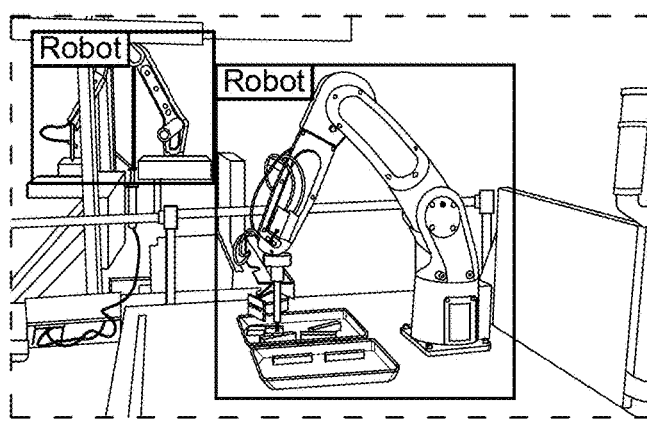
Figure 27:
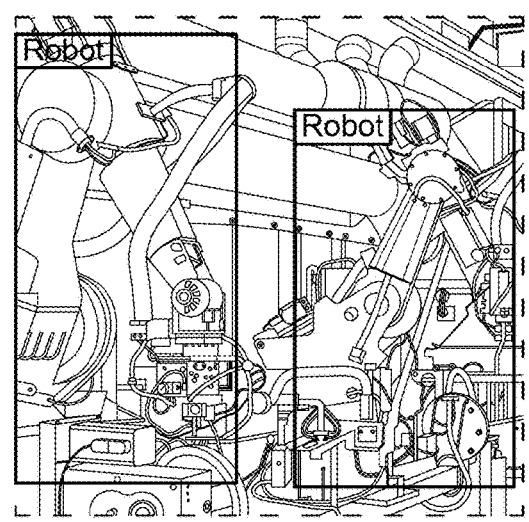
Figure 28:
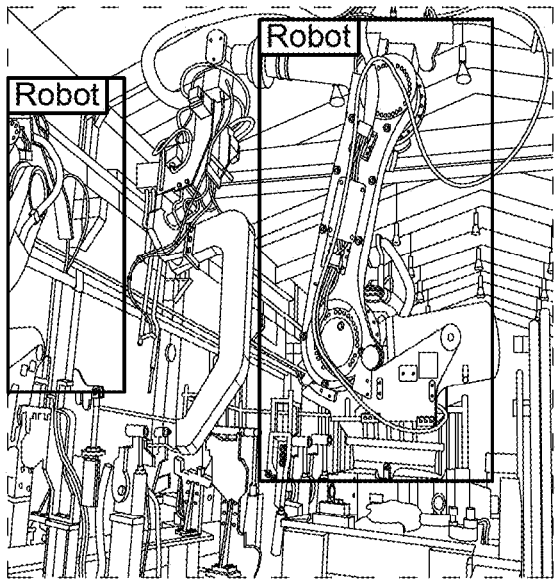
Figure 29:
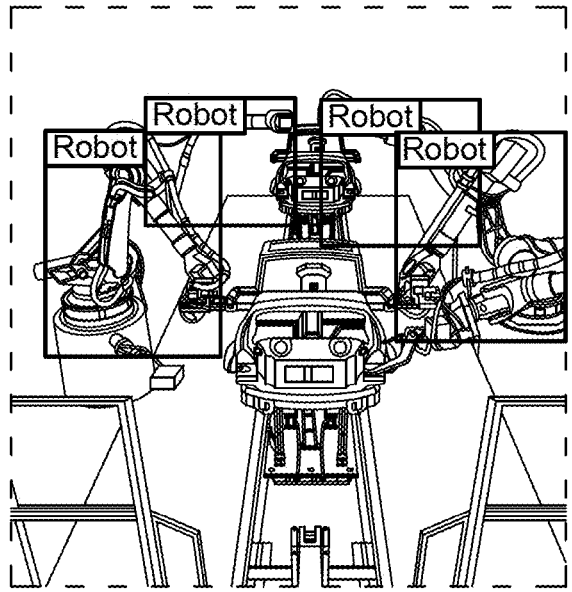
Figure 30:
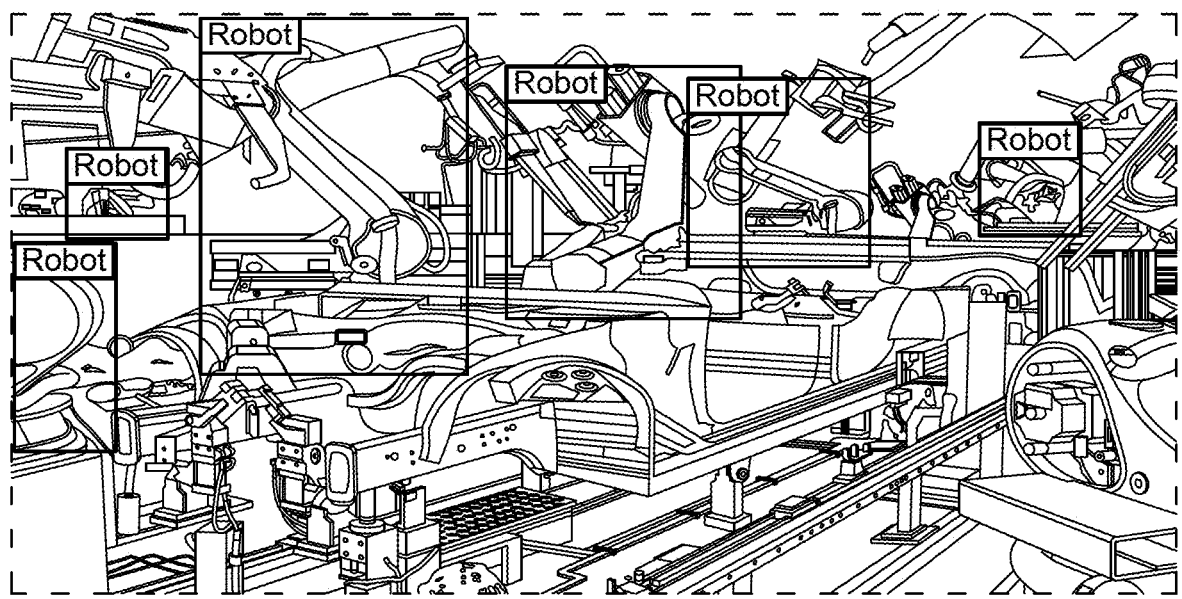

FIG. 23 illustrates an example of the linear blending. FIG. 23 shows a real manufacturing scene 230 comprising a real manufacturing robot and the virtual scene 232 generated from the real scene 230. FIG. 23 further shows the result of the linear blending which is the virtual manufacturing scene 234.

Referring back to the flowchart of FIG. 1, the inferring S60 of a spatially reconfigurable object from a scene of the test dataset of the test domain transferred on the intermediary domain is now discussed.

First, inferring S60 a spatially reconfigurable object from a scene may consist inferring a spatially reconfigurable object from one scene, or inferring, for each scene of an input dataset of scene, inferring a spatially reconfigurable object from each scene of the input dataset of scenes. Notably, the inferring S60 may constitute a testing stage of the domain-adaptive neural network, where all scenes of the test dataset are provided (e.g. successively) as input to the domain-adaptive neural network which infers one or more spatially reconfigurable objects in each inputted scene. Additionally or alternatively, the inferring S60 may constitute an applicative stage of the domain-adaptive learning method and/or of the domain-adaptive inferring method and/or of the process, where the input dataset is a dataset of scenes of the test domain which is not equal to the test dataset. In such cases, the application stage may comprise providing the input dataset, inputting each scene of the input dataset to the domain-adaptive neural network, and carrying out the inferring S60 for each scene. It is also to be understood that inferring S60 a spatially reconfigurable object in one scene may consists in inferring (e.g. simultaneously or successively) one or more spatially reconfigurable objects in the scene which comprises one or more of such objects, e.g. by inferring all the spatially reconfigurable objects in the scene.

The inferring S60 of one spatially reconfigurable object in one scene, which may be part of the inferring S60 of more spatially reconfigurable objects in the scene, is now discussed. Inferring S60 the spatially reconfigurable object in the scene by applying the domain-adaptive neural network consists in inputting the scene to the domain-adaptive neural network. The domain-adaptive neural network then outputs data pertaining to the location of the spatially reconfigurable object. For example, the neural network may output a (e.g. digital) image representation of the scene where a respective bounding box encompass the inferred spatially reconfigurable objects. The inference may also comprise the computing of such a bounding box and/or the labelling of the bounding box (e.g. as encompassing a spatially reconfigurable object of the scene) and/or the labelling of the inferred spatially reconfigurable object (as a spatially reconfigurable object). The output of the neural network may be stored in a database and/or displayed on a screen of a computer.

FIGS. 24 to 29 illustrate inference of manufacturing robots in real manufacturing scenes. FIGS. 24 to 29 each show a respective real scene of the test domain fed as input to the domain-adaptive neural network and bounding boxes computed and annotated around all manufacturing robot comprised in each respective scenes. As shown on FIGS. 26 to 30, several robots and/or robots at least partially occluded can be inferred in a real scene.

The inferring of spatially reconfigurable objects may in fact be carried out by a detector, which forms at least a part of the domain-adaptive neural network performing jointly a task of recognition (or classification) and a task of localization of spatially reconfigurable objects in a real scene of the test dataset. The task of localization comprises computing bounding boxes each encompassing a spatially reconfigurable object of the scene inputted to the detector. As previously said, a bounding box is a rectangular box which axes are parallel to the image sides, and it is characterized by four coordinates. In examples, the detector returns for each spatially reconfigurable object of the scene inputted to the detector a bounding box centered on the object with appropriate ratio and scale. The task of classification comprises labelling each computed bounding box with a respective label (or annotation) and associating to the label a confidence score. The confidence score reflects the confidence of the detector that the bounding box truly encompasses a spatially reconfigurable object of the scene provided as input. The confidence score may be a real number between 0 and 1. In such cases, the closer the confidence score is to 1, the more confident the detector is for the label associated with the corresponding bounding box to truly annotate a spatially reconfigurable object.

In examples where the domain-adaptive neural network is configured for inference of objects in real scenes, for example when the test domain is made of reals scenes and when the intermediary domain is made of virtual scenes, the domain-adaptive neural network may further comprise an extractor. The extractor forms a part of the domain-adaptive neural network configured for outputting image representations of real scenes and feeding them to other parts of the domain-adaptive neural network, e.g. a detector or parts of a detector, for example overseeing the detection of spatially reconfigurable objects. In examples, this means that the extractor may process scenes of the intermediary domain to output image representations of the scenes, for example by learning robust convolutional filters for real data style. Layers of neurons of the extractor typically encode the representation of a real or photo-realistic image to be outputted. This amounts to say that the extractor oversees outputting image representations of scenes belonging to the intermediary domain while at least one other part of the domain-adaptive neural network (e.g. the previously discussed detector) oversees detecting (e.g. localizing and classifying) spatially reconfigurable objects in each inputted scene of the third domain. Said detecting may be based on said image representations outputted by the student extractor. This allows to efficiently process and output real data.

Each scene provided as input to the domain-adaptive neural network is a scene belonging to the test domain, but which is transferred on the determined to intermediary domain. In other words, providing as input the scene to the domain-adaptive neural network comprises transferring the scene on the intermediary domain and feeding the transferred scene as input to the domain-adaptive neural network. Transferring the scene may be carried out by any method able to transfer a scene from one domain to another. In examples, transferring the scene may comprise transforming the scene into another scene and optionally blending the scene with the transformed scene. In such cases, the transforming and optionally the blending may be carried out as in the examples previously described with reference to the flowchart of FIG. 4. Notably, the scenes of the intermediary domain may in fact be scenes of the test dataset transferred on the intermediary domain.

An implementation of the process is now discussed.

This implementation proposes a learning framework in the virtual world in order to tackle the manufacturing data insufficiency problem. The implementation notably learns a domain-adaptive neural network leveraging a dataset of virtual simulations for learning and the efficiency of image treatment methods, namely the Deep Neural Networks (DNN).

Virtual simulations constitute one form of obtaining virtual data for training. The latter has been appearing as promising technique to cope with the difficulty of obtaining the required training data for machine learning tasks. Virtual data is generated algorithmically to mimic the characteristics of the real data while having an automatic, error-free and cost-free labelling.

Virtual simulations are proposed by this implementation to better explore the working mechanism of the different manufacturing equipment. Formally, different manufacturing tools are considered in the learning process via the different status that they can present when functioning.

Deep Neural Networks: are a powerful set of techniques for learning in Neural Networks [19] which is a biologically-inspired programming paradigm enabling a computer to learn from observational data. In image recognition, the success of DNNs is attributed to their ability to learn rich midlevel media representations as opposed to hand-designed low-level features (Zernike moments, HOG, Bag-of-Words, SIFT, etc.) used in other image categorization methods (SVM, Boosting, Random Forest, etc.). More specifically, DNNs are focused on end-to-end learning based on raw data. In other words, they move away from feature engineering to a maximal extent possible, by accomplishing an end-to-end optimization starting with raw features and ending in labels.

Domain adaptation: is a field associated with machine learning and transfer learning. This scenario arises when aiming at learning from a source data distribution a well performing model on a different (but related) target data distribution. The aim of domain adaptation is to find effective mechanisms to transfer or adapt knowledge from one domain to another one. This is achieved by introducing cross-domain bridging components to remedy to the cross-domain gap between train and test data.

Figure 31:
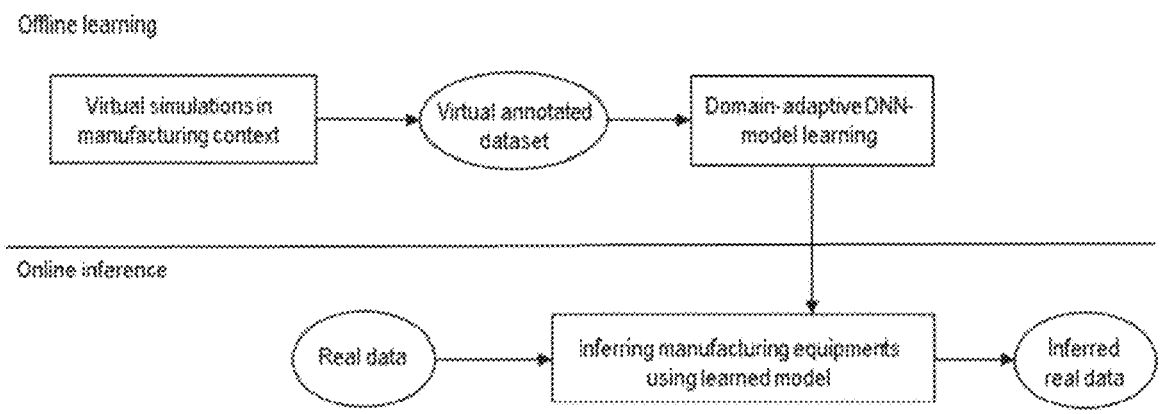

The proposed implementation is notably illustrated by FIG. 31 which shows a diagram illustrating the offline and the online stages of the process.

1. Offline stage: this stage aims at training a model using virtual data that is supposed to be competent when inferring in the real world. It contains two main steps. Note that this stage is transparent from the user.
   1) Virtual simulations in virtual manufacturing environment to generate representative virtual training data that are automatically annotated. The virtual manufacturing environment is geometrically realistic but not photo-realistic. The annotation type depends on the targeted inference task.
   2) A neural network model is learned based on the virtual data. It consists on a domain-adaptive DNN-based model.
2. Online stage: given a real-world media, the learned domain-adaptive model is applied to infer manufacturing equipment's.

This implementation of the process notably relates to the field of fully-supervised object detection. Specifically, in this specific implementation we are interested in the manufacturing context and the goal is to detect industrial robot arms in factory images. For the said fully-supervised field, the training dataset should contain up to hundreds of thousands of annotated data, which justifies the use of virtual data for training.

State-of-the-art object detectors are based on deep learning models. Millions of parameters which values cannot be set by hand characterize these models. Hence, these parameters must be set thanks to a learning algorithm. When the learning algorithm is updating the model parameters, the model is said to be in "training mode". It consists in successively "correcting" the model according to its output for each input thanks to the annotations associated with each input. An annotation is a set of data associated with a specific input which allows evaluating if the output of the model is true or false. For instance, an object classifier which is trained to distinguish images of cats and dogs need a dataset of annotated images of cats and dogs, each annotation being "cat" or "dog". Thus, if in its training mode the object classifier outputs "dog" for a cat image in input, the learning algorithm will correct the model by updating its parameters. This way of supervising the training of a model thanks to an annotated dataset is called "supervised learning". Once the model is trained, we stop updating its parameters. Then, the model is only used to process a new input (i.e. an unseen input during the training mode) and return detection results, it is said to be in "test mode".

In the context of the present implementation, an object detector returns two different outputs as the task of "detection" means performing jointly a task of recognition (or classification) and a task of localization.
1. Localization output: object localization is made thanks to bounding boxes. A bounding box is a rectangular box which axes are parallel to the image sides. It is characterized by four coordinates. Ideally, an object detector returns for each object a bounding box centers on the object with appropriate ratio and scale.
2. Classification output: object classification is made thanks to a category label associated with a confidence score for each bounding box. The confidence score is a real between 0 and 1. The closer it is to 1, the more confident the object detector is for the category label associated with the corresponding bounding box.

Figure 32:
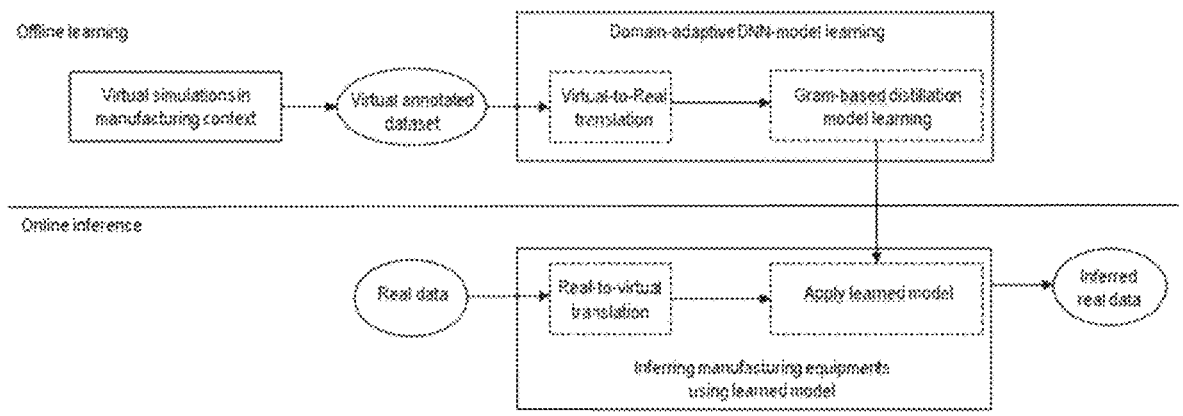

The implementation is notably illustrated by FIG. 32 which shows domain-adaptive components used on both offline and online stages.

It concerns learning an object detection model using a generated virtual data. Several domain adaptation approaches are applied to address the virtual-real domain gap within both stages: offline and online.
1. Offline stage: this stage aims at training a model using virtual data that is supposed to be competent when inferring in the real world. This stage contains two main steps.
   1) Virtual simulations in virtual manufacturing environment to generate representative virtual training data that are automatically annotated with bounding boxes and "robot" label.
   2) Domain-adaptive transformations
      i. At the training set level: The latter is transformed to a new training domain that is closer to the real world in terms of data distribution.
      ii. At the model architecture level: Domain-adaptive modules are inserted in a model to address the problematic virtual-real domain shift.
2. Online stage: real-world media is transformed into a new test domain that is better processed by the learned detection model, before being inferred by the latter. In other words, the new test domain is closer to the training domain than original real domain.

It is important to note that one particularity of this implementation is that it does not encounter the problem of virtual-to-real image transformation accuracy. The intuition behind the current work is to consider intermediate domains between the virtual and real worlds instead of trying to migrate virtual data to the real world. Formally, the virtual training data and the real testing data are dragged respectively to a training and test intermediate domains where domain shift is minimum.

In the light of the framework described above, one may understand that the currently discussed implementation is based on two main steps:

Virtual data generation for learning.
Domain adaptation.

To cope with the scarcity of the factory images, this implementation builds on a virtual data generation approach based on simulations. The training set consists of 3D rendered factory scenes. These factory scenes are generated by an internal design application of the company accompanied by masks segmenting the objects of interest (robots) at the pixel level. Each scene is simulated into multiple frames describing the multiple functioning status that a robot may have.

This step generates a virtual image set with distinctive and complicated features for the task of detecting robots in manufacturing context. Although it seems a 'simple' single-object detection task, baseline detectors and state-of-the-art domain-adaptive networks are not competent in the matter. Formally, the generated set is non photo-realistic and rather 'cartoonish'. The simplicity of the generated virtual scenes reflects the easiness to generate our training data, which is a major benefit of the present implementation. At the same time, the complexity of the object of interest makes it hard to envisage using state-of-the-art approaches tackling this kind of virtual data, namely domain randomization DR technique (see [7,15]).

In fact, domain randomization abandons photorealism by randomly perturbing the environment in non-photorealistic ways. The intuition behind this DR is to teach the algorithm to force the network to learn to focus on the essential features of the images and to ignore objects in the scene that are not of interest. More formally, the main realistic features that lack in virtual data are low-level forms of the images, e.g., texture, lighting and shading. DR ensures the perturbation of these features over the training dataset so that the algorithm will not rely on them to recognize objects. Following the same logic, the DR will not impact the common features between real and virtual data. Under the scope of the used virtual data generation, one may understand that the correct features that the learned model is expected to rely on for learning are shapes and contours. This is important in DR techniques.

Besides, the object of interest of the present implementation, which is a robot, has many joints' configurations (generally 6 freedom degrees) that are calibrated by a continuous range of values. This gives each robot type an infinity range of possible status. Hence, randomizing all the distinctive features except the shapes and contours for learning is non-optimal for this kind of complicated industrial objects. Actually, the required variability to represent objects' shapes and contours is hard to meet when the latter are complicated. Particularly for the robot example, it is indeed non conceivable to learn a model that is able to extract and focus on distinctive shapes and contours of various robot types with infinite joints' positions to recognize the said object in images.

The proposed implementation is builds a learning problem that is competent when data is complex such as the present case.

The proposed domain adaptation approach can be considered as a partial domain randomization technique. Formally, it proposes to augment the correct features that the model is learning on by, deliberately, either randomizing or translating data features to a new domain better representative of the real world than the virtual one. For instance, it can better explore the specificity of texture characteristics. To do so, three novel techniques are implemented in the currently discussed implementation:

1. Virtual-to-Real Translation

To remedy to the cross domain shift, a common way in state of the art articles is to change the appearance of the virtual data to appear as if they were drawn from the real domain i.e. they acquire a distribution that is better representative of the real world. To do so, virtual images are modified as a whole using real scenes without any correspondence between similar objects. However, to get an optimal performance of image-to-image translation, one may guess that it is beneficial to have real robot textures transferred to robots in virtual scenes and same thing for the background.

The current implementation is built upon this targeted appearance transfer by applying different image-to-Image translation networks separately on robots and factory backgrounds in each media from the training set.

To this end, we use CycleGAN model [20] to translate an image from one domain to another. It proposes a method that can learn to capture special characteristics of one image set and to figure out how to translate these characteristics into a second image collection, all in the absence of any paired training examples. This relaxation of having one-to-one mapping makes in fact this formulation quite powerful. This is achieved by a generative model, specifically a Generative Adversarial Network (GAN) dubbed CycleGAN.

As described above, two different models are trained separately

CycleGAN Virtual-to-Real network 1: trained on two factory background sets: virtual set and real set. It results in a virtual-to-real factory generator that is used to modify the backgrounds in virtual images.

CycleGAN Virtual-to-Real 2: trained on two robot sets: virtual set and real set. It results in a virtual-to-real robot generator that is used to modify the robots in virtual images.

2. Gram-Based Distillation

In order to better emphasize model robustness with respect to domain shift, we propose a novel knowledge distillation approach implemented at the detector level. Note that most of state of the art detectors (see [18, 9]) contain a feature extractor that is a deep network of convolutional layers. The feature extractor outputs the image representation to be fed to the remaining parts of the detector. The intuition behind our distillation is to guide the detection model to learn robust convolutional filters for the real data style, which is aligned with the primary objective of making the model invariant to data appearance.

Formally, the implementation consists of training the detector on virtual media, and at the same time, updating detector's feature extractor weights in order to approach the style encoded by the two layer representations of a real image fed to both our detector and a second one pre-trained on real data from open source.

Note that the style representation of an image at some layer $\ell$ is encoded by the feature distribution in this layer. For this implementation, we use the Gram matrix that encodes the feature correlation, which is one form of the feature distribution embedding. Formally, for a layer $\ell$ of response $F^\ell$ with filters of length $N^\ell$, the feature correlations are given by the Gram matrix $G^\ell \in R^{N^\ell \times N^\ell}$, where $G^\ell_{i,j}$ is the inner product between the vectorized feature map i and j in layer $\ell$:

$$G^\ell_{i,j} = \sum_k F^\ell_{i,k} F^\ell_{j,k}$$

The intuition behind the proposed distillation is to ensure that, during learning, the detector's feature extractor weights are updated so that it outputs data style representation close to the one that another pre-trained feature extractor on real data would produce. To do so, the currently discussed implementation implements the Gram-based distillation loss $L_{distillation}$ at the feature extractor level.

Given a real image, we denote by $F^\ell$ and $E^\ell$ the corresponding feature map outputs at some layer $\ell$ of, respectively, the detector's feature extractor and the pre-trained one. Hence, the proposed distillation loss at layer $\ell$ is the Euclidean distance between the corresponding Gram Matrices $G^\ell_F$ and $G^\ell_E$ $$L^\ell_{distillation} = \| G^\ell_F - G^\ell_E \|$$

Consider distilling knowledge from layers $\{\ell_1, \ldots, \ell_m\}$ then the distillation loss is defined as $$L_{distillation} = \sum_{1 \leq i \leq m} L^{\ell_i}_{distillation}$$

The total training loss is $$L_{training} = L_{detector} + L_{distillation}$$

3. Real-to-Virtual Translation

One may expect that the task of translating virtual images to real domain cannot be perfectly accomplished. This means that the modified data is closer to real world than the virtual one without being perfect match to reality distribution. That's why, we assume that the modified virtual data are transferred to a new domain $D_1$ located between synthetic and real domains. One contribution of this work is to extend the domain adaptation to the real test data by dragging this latter to another new domain $D_2$. In order to use this approach, $D_2$ should be closer to $D_1$ than the real domain in terms of distribution; which is an assumption that is confirmed in the present application case by comparing data representations. This form of adaptation is achieved by applying the real-to-virtual data translation on the test data, namely, the inverse operation previously applied on virtual data at the training phase.

In the context of the present implementation, the transformations are ensured by training a CycleGAN Real-to-Virtual network trained on two robot sets: virtual set and real set. It results in a Real-to-Virtual robot generator that is used to modify the real test images. At this level, we chose to train CycleGAN network on robot sets since we are interested mainly in adapting robots' appearance in test images in order to be recognized by the detector. Note that it is also possible to perform a more sophisticated image translation for test data by targeting regions separately as it was done for the training set. However, the improvement is limited, and we are contented with applying one CycleGAN network for the whole test image.

The invention claimed is:

1. A computer-implemented method of machine-learning, comprising:
   obtaining:
      a dataset of virtual scenes, the dataset of virtual scenes belonging to a first domain, and
      a test dataset of digital images of real scenes belonging to a second domain;
   determining a third domain, the third domain being closer to the second domain than the first domain in terms of data distributions, closeness between domains being quantified by a distance, the distance between the third domain and the second domain being smaller than the distance between the second domain and the first domain; and
   learning a domain-adaptive neural network based on the third domain, the domain-adaptive neural network being a neural network configured for inference of spatially reconfigurable objects in a real scene in that the domain-adaptive neural network is configured to take as input a digital image of a real-scene and to detect one or more spatially reconfigurable objects in the real scene.

2. The method of claim 1, wherein the determining of the third domain includes, for each scene of the dataset of virtual scenes:
   extracting one or more spatially reconfigurable objects from the scene; and
   for each extracted object, transforming the extracted object into an object closer to the second domain than the extracted object in terms of data distributions.

3. The method of claim 2, wherein the determining of the third domain further comprises:
   for each transformed extracted object, placing the transformed extracted object in one or more scenes each closer to the second domain than the first domain in terms of data distributions, the third domain including each scene on which the transformed extracted object is placed.

4. The method of claim 3, wherein the placing of the transformed extracted object in the one or more scenes is carried out randomly.

5. The method of claim 3, wherein the determining of the third domain including placing one or more distractors in each respective one of one or more scenes included in the third domain, a distractor being an object which is not a spatially reconfigurable object.

6. The method of claim 1, wherein the learning of the domain-adaptive neural network further comprises:
   obtaining a teacher extractor, the teacher extractor being a machine-learned neural network configured for outputting image representations of real scenes; and
   training a student extractor, the student extractor being a neural network configured for outputting image representations of scenes belonging to the third domain, the training of the student extractor including minimizing a loss which, for each scene of one or more real scenes, penalizes a disparity between a result of applying the teacher extractor to the scene and a result of applying the student extractor to the scene.

7. The method of claim 6, wherein the result of applying the teacher extractor to the scene is a first Gram matrix and the result of applying the student extractor to the scene is a second Gram matrix.

8. The method of claim 7, wherein:
   the first Gram matrix is computed on several layers of neurons of the teacher extractor, said layers of neurons including at least the last layer of neurons, and
   the second Gram matrix is computed on several layers of neurons of the student extractor, said layers of neurons including at least the last layer of neurons.

9. The method of claim 6, wherein the disparity is a Euclidean distance between the result of applying the teacher extractor to the scene and the result of applying the student extractor to the scene.

10. The method of claim 1, wherein each virtual scene of the dataset of virtual scenes is a virtual manufacturing scene includes one or more spatially reconfigurable manufacturing tools, the domain-adaptive neural network being configured for inference of spatially reconfigurable manufacturing tools in a real manufacturing scene.

11. The method of claim 1, wherein each real scene of the test dataset is a real manufacturing scene includes one or more spatially reconfigurable manufacturing tools, the domain-adaptive neural network being configured for inference of spatially reconfigurable manufacturing tools in a real manufacturing scene.

12. A non-transitory data storage medium having recorded thereon a domain-adaptive neural network learnable according to a computer-implemented method of machine-learning, the method comprising:
   obtaining:
      a dataset of virtual scenes, the dataset of virtual scenes belonging to a first domain, and
      a test dataset of digital images of real scenes belonging to a second domain;
   determining a third domain, the third domain being closer to the second domain than the first domain in terms of data distributions, closeness between domains being quantified by a distance, the distance between the third domain and the second domain being smaller than the distance between the second domain and the first domain; and
   learning a domain-adaptive neural network based on the third domain, the domain-adaptive neural network being a neural network configured for inference of spatially reconfigurable objects in a real scene in that the domain-adaptive neural network is configured to take as input a digital image of a real-scene and to detect one or more spatially reconfigurable objects in the real scene.

13. The non-transitory data storage medium of claim 12, wherein the determining of the third domain includes, for each scene of the dataset of virtual scenes:
  extracting one or more spatially reconfigurable objects from the scene; and
  for each extracted object, transforming the extracted object into an object closer to the second domain than the extracted object in terms of data distributions.

14. The non-transitory data storage medium of claim 13, wherein the determining of the third domain further comprises:
  for each transformed extracted object, placing the transformed extracted object in one or more scenes each closer to the second domain than the first domain in terms of data distributions, the third domain including each scene on which the transformed extracted object is placed.

15. The non-transitory data storage medium of claim 14, wherein the placing of the transformed extracted object in the one or more scenes is carried out randomly.

16. A device comprising:
  a non-transitory data storage medium having recorded thereon a computer program having instructions for machine-learning that when executed a processor causes the processor to be configured to:
  obtain:
    a dataset of digital images of virtual scenes, the dataset of virtual scenes belonging to a first domain, and
    a test dataset of real scenes belonging to a second domain,
  determine a third domain, the third domain being closer to the second domain than the first domain in tennis of data distributions, closeness between domains being quantified by a distance, the distance between the third domain and the second domain being smaller than the distance between the second domain and the first domain, and
  learn a domain-adaptive neural network based on the third domain, the domain-adaptive neural network being a neural network configured for inference of spatially reconfigurable objects in a real scene in that the domain-adaptive neural network is configured to take as input a digital image of a real-scene and to detect one or more spatially reconfigurable objects in the real scene.

17. The device of claim 16, wherein the processing is further configured to determine the third domain by being configured to, for each scene of the dataset of virtual scenes:
  extract one or more spatially reconfigurable objects from the scene, and
  for each extracted object, transform the extracted object into an object closer to the second domain than the extracted object in terms of data distributions.

18. The device of claim 17, wherein the processing is further configured to determine the third domain by being configured to
  for each transformed extracted object, place the transformed extracted object in one or more scenes each closer to the second domain than the first domain in terms of data distributions, the third domain including each scene on which the transformed extracted object is placed.

19. The device of claim 18, wherein the placing of the transformed extracted object in the one or more scenes is carried out randomly.

20. The device of claim 16, further comprising the processor coupled to the non-transitory data storage medium.

* * * * *